(12) United States Patent
Casey et al.

(10) Patent No.: US 11,398,934 B1
(45) Date of Patent: Jul. 26, 2022

(54) ULTRA-HIGH-SPEED PAM-N CMOS INVERTER SERIAL LINK

(71) Applicant: XILINX, INC., San Jose, CA (US)

(72) Inventors: Ronan Sean Casey, Cork (IE); Lokesh Rajendran, Cork (IE); Declan Carey, Cork (IE); Kevin Zheng, San Jose, CA (US); Catherine Hearne, Fermoy (IE); Hongtao Zhang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/478,883

(22) Filed: Sep. 18, 2021

(51) Int. Cl.
*H04L 25/49* (2006.01)
*H04L 27/04* (2006.01)

(52) U.S. Cl.
CPC .......... *H04L 25/4917* (2013.01); *H04L 27/04* (2013.01)

(58) Field of Classification Search
CPC .. H04B 10/504; H04B 10/541; H04B 10/505; H04B 10/588; H04L 25/4917; H04L 27/04
See application file for complete search history.

(56) References Cited

U.S. PATENT DOCUMENTS

| | | | | |
|---|---|---|---|---|
| 6,772,351 | B1 * | 8/2004 | Werner | G11C 8/10 710/110 |
| 7,308,044 | B2 * | 12/2007 | Zerbe | H04L 25/4917 327/333 |
| 7,505,541 | B1 * | 3/2009 | Brunn | H03L 7/101 375/360 |
| 8,593,217 | B1 * | 11/2013 | Kong | H03H 15/00 327/554 |
| 8,989,300 | B1 * | 3/2015 | Asmanis | H04B 10/697 375/324 |
| 9,000,812 | B1 * | 4/2015 | Lowney | H03K 17/162 327/108 |
| 9,007,096 | B1 * | 4/2015 | Carey | H03F 3/45197 330/252 |
| 9,100,232 | B1 * | 8/2015 | Hormati | H04L 25/0276 |
| 9,106,462 | B1 * | 8/2015 | Aziz | H04L 25/03057 |
| 9,143,171 | B1 * | 9/2015 | Chang | H04L 12/12 |
| 9,184,841 | B2 * | 11/2015 | Robinson | H04B 10/60 |
| 9,191,245 | B2 * | 11/2015 | Tan | H04L 25/03057 |
| 9,231,793 | B1 * | 1/2016 | Vareljian | H04L 25/03057 |
| 9,237,047 | B1 * | 1/2016 | Zhang | H04L 27/06 |
| 9,337,993 | B1 * | 5/2016 | Lugthart | H04L 7/0062 |
| 9,374,217 | B1 * | 6/2016 | Forey | H04L 7/033 |

(Continued)

OTHER PUBLICATIONS

Weng, S.-H. et al., "Energy Efficiency Optimization Through Codesign of the Transmitter and Receiver in High-Speed On-Chip Interconnects," in IEEE Transactions on Very Large Scale Integration (VLSI) Systems, vol. 22, No. 4, pp. 938-942, Apr. 2014.

(Continued)

*Primary Examiner* — James M Perez
(74) *Attorney, Agent, or Firm* — Patterson + Sheridan, LLP

(57) ABSTRACT

Methods, systems, and apparatus described herein make a multi-level PAM signal (PAM-N signal) at a transmitter using CMOS-based components. By forming the PAM-N signal at the transmitter, receivers do not have to recombine and/or realign multiple signals and only employs a single transmission line channel (or two transmission line channels in differential implementations) to convey the data stream to the receiver from the transmitter.

20 Claims, 14 Drawing Sheets

(56) References Cited

U.S. PATENT DOCUMENTS

| | | | |
|---|---|---|---|
| 9,397,824 B1* | 7/2016 | Hoshyar | H04L 27/01 |
| 9,553,742 B1* | 1/2017 | Xu | H04L 25/0384 |
| 9,559,880 B1* | 1/2017 | Cirit | H04L 25/03343 |
| 9,608,611 B1* | 3/2017 | Hearne | H03K 5/135 |
| 9,755,870 B1* | 9/2017 | Cirit | H04L 25/4917 |
| 9,832,048 B2* | 11/2017 | Kireev | H03K 19/018528 |
| 9,876,489 B1* | 1/2018 | Casey | H03K 5/135 |
| 9,933,639 B1* | 4/2018 | Lin | G02F 1/025 |
| 9,966,908 B1* | 5/2018 | Carey | H03F 3/45973 |
| 10,263,815 B1* | 4/2019 | Geary | H04L 25/03878 |
| 10,312,896 B2* | 6/2019 | Kim | H04L 27/04 |
| 10,348,290 B1* | 7/2019 | Zhang | H04B 1/04 |
| 10,491,436 B1* | 11/2019 | Lim | H03F 3/45139 |
| 10,505,509 B2* | 12/2019 | Lakshmikumar | H03K 3/0315 |
| 10,547,475 B1* | 1/2020 | Gagnon | H04L 25/03057 |
| 10,680,592 B2* | 6/2020 | Zhao | H04L 7/0016 |
| 10,715,150 B1* | 7/2020 | Carey | H03K 21/10 |
| 10,848,171 B1* | 11/2020 | Carey | H03K 19/017509 |
| 10,868,663 B1* | 12/2020 | Turker Melek | H04L 7/0004 |
| 10,911,060 B1* | 2/2021 | Neto | G11C 27/02 |
| 2005/0069067 A1* | 3/2005 | Zerbe | H04L 25/4917 375/353 |
| 2012/0033760 A1* | 2/2012 | Zheng | H04L 25/4904 375/295 |
| 2015/0003505 A1* | 1/2015 | Lusted | H04L 25/03343 375/224 |
| 2015/0055694 A1* | 2/2015 | Juenemann | H04L 27/066 375/326 |
| 2015/0071651 A1* | 3/2015 | Asmanis | H04B 10/697 398/141 |
| 2015/0071653 A1* | 3/2015 | Robinson | H04B 10/541 398/208 |
| 2015/0222366 A1* | 8/2015 | Asmanis | H04B 10/504 398/186 |
| 2016/0006596 A1* | 1/2016 | Dickson | H04L 27/364 375/298 |
| 2016/0103382 A1* | 4/2016 | Liboiron-Ladouceur | H04B 10/516 385/3 |
| 2016/0182080 A1* | 6/2016 | Vasani | H03M 1/068 341/145 |
| 2017/0063580 A1* | 3/2017 | Kireev | H04L 25/06 |
| 2018/0013435 A1* | 1/2018 | Namkoong | H03L 7/0891 |
| 2018/0234096 A1* | 8/2018 | Li | H03F 3/082 |
| 2019/0089466 A1* | 3/2019 | Li | H04L 25/4917 |
| 2019/0103148 A1* | 4/2019 | Hasbun | H04L 27/06 |
| 2019/0123728 A1* | 4/2019 | Zhao | H03K 5/1565 |
| 2019/0181958 A1* | 6/2019 | Rylyakov | H04L 25/03057 |
| 2019/0253812 A1* | 8/2019 | Gallégo | A61B 5/398 |
| 2020/0106529 A1* | 4/2020 | Nakamura | H04B 10/695 |

OTHER PUBLICATIONS

Zhang, Y. et al., "Design methodology of high performance on-chip global interconnect using terminated transmission-line," 2009 10th International Symposium on Quality Electronic Design, 2009, pp. 451-458.

Tan, K. et al., "A 112-GB/S PAM4 Transmitter in 16NM FinFET," 2018 IEEE Symposium on VLSI Circuits, 2018, pp. 45-46.

Chiang, P.-C. et al., "2.3 60Gb/s NRZ and PAM4 transmitters for 400GbE in 65nm CMOS," 2014 IEEE International Solid-State Circuits Conference Digest of Technical Papers (ISSCC), 2014, pp. 42-43.

Im, J. et al., "A 112-Gb/s PAM-4 Long-Reach Wireline Transceiver Using a 36-Way Time-Interleaved SAR ADC and Inverter-Based RX Analog Front-End in 7-nm FinFET," in IEEE Journal of Solid-State Circuits, vol. 56, No. 1, pp. 7-18, Jan. 2021.

* cited by examiner

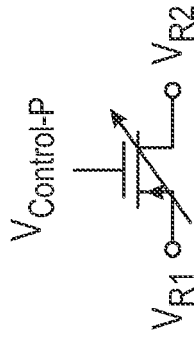
FIG. 6A
FIG. 6B
FIG. 6C
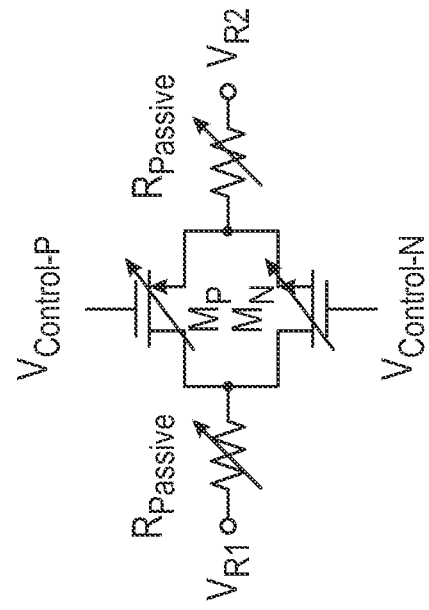
FIG. 6D
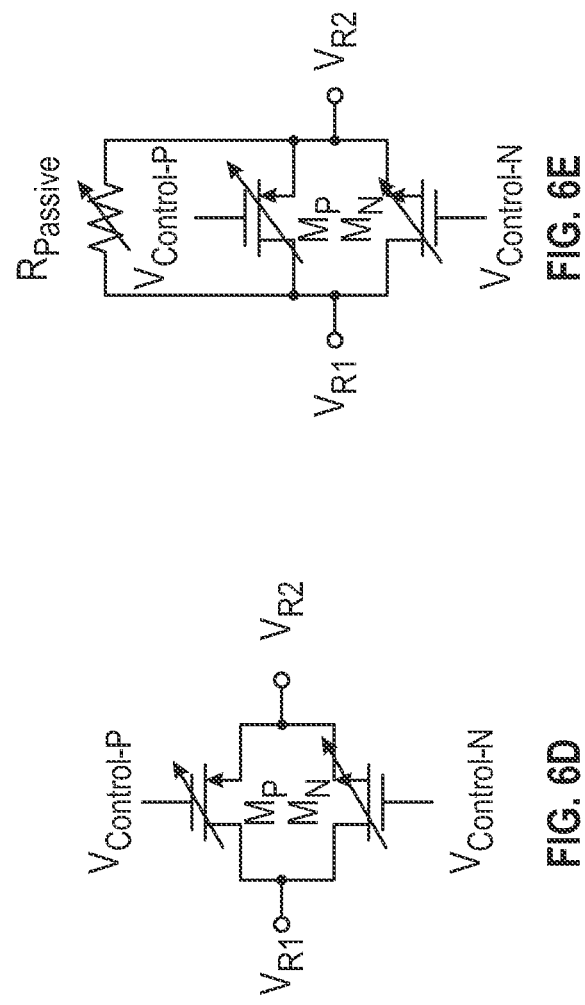
FIG. 6E
FIG. 6F

ULTRA-HIGH-SPEED PAM-N CMOS INVERTER SERIAL LINK

TECHNICAL FIELD

Examples of the present disclosure generally relate to on-chip and inter-chip data links, specifically those used for driving and terminating on-chip and inter-chip transmission lines or channels of various types and properties.

BACKGROUND

As technology evolves, integrated circuits (ICs) are increasingly used to transmit data on- or inter-chip. The on-chip and inter-chip data transmissions may employ inverter buffers (for example, a current-mode or complementary metal-oxide-semiconductor (CMOS) buffer) and a transmission line or channel with or without repeaters. Such data transmissions may further use non-return-to-zero (NRZ) or 2-level signaling. However, as the on-chip and inter-chip data transmissions increase beyond 2-level signaling (for example, to multi-level signaling, such as pulse amplitude modulation level 4 (PAM-4), PAM-8, and so forth—and this can be generalized as PAM-N, where N is the number of signal levels), the corresponding data transmission systems become more complicated than the CMOS buffers and repeaters introduced above.

This may occur for various reasons. For example, CMOS inverters may be conducive to NRZ signals—because although they are non-linear circuits, they fortunately tend to saturate the signal to two discrete levels—thus maintaining the two discrete signal levels desired in NRZ signaling. However, they are generally unable to easily generate, transmit, or buffer multi-level signals that have more than two discrete levels (for example, PAM4)—because the CMOS inverters saturate or limit any incoming signal back down to two levels, thus irrecoverably distorting the multi-level signal. Other options for communicating multi-level signals, including current mode logic (CML) or multiple NRZ parallel paths introduce additional complexity and issues with communicating PAM-N signals between a transmitter and a receiver (compared to traditional serial NRZ systems employing CMOS buffers/repeaters).

Thus, solutions for leveraging CMOS-type buffer circuits in on-chip and inter-chip data transmissions using multi-level signaling are desired.

SUMMARY

Methods, systems, and apparatus described herein make a multi-level PAM signal (PAM-N signal) at a transmitter using CMOS-based components. By forming the PAM-N signal at the transmitter, receivers do not have to recombine and/or realign multiple signals and only employs a single transmission line channel (or two transmission line channels in differential implementations) to convey the data stream to the receiver from the transmitter.

In one example, a transmitter circuit is provided that includes two or more input converter circuits coupled in parallel, and a combining circuit. Each of the two or more input converter circuits is configured to convert a non-return-to-zero (NRZ) input voltage signal to a corresponding current signal. The combining circuit is configured to combine and convert the two or more corresponding current signals into an output voltage signal. The two or more input converter circuits and the combining circuit convert the corresponding two or more NRZ input voltage signals received by the two or more input converter circuits into a pulse amplitude modulation level N (PAM-N) signal output as the output voltage signal. The two or more input converter circuits and the combining circuit comprise a CMOS-inverter-based circuit. The value N is defined based, at least in part, on a number of NRZ input voltage signals received by the two or more input converter circuits and relative strengths of the input converter circuits.

In another example, a method of transmitting data signals is provide. The method includes receiving a plurality of non-return to zero (NRZ) input voltage signals at a plurality of parallel coupled corresponding input converter circuits; generating a plurality of current signals based on converting each of the plurality of NRZ input voltage signals into a corresponding current signal via the plurality of parallel coupled corresponding input converter circuit; combining, via a combiner converter circuit, the plurality of current signals into a multilevel pulse amplitude modulation (PAM-N) current signal; and converting the multilevel PAM-N current signal into a PAM-N output voltage signal. The plurality of parallel coupled corresponding input converter circuits and the combiner converter circuit comprise CMOS-inverter-based circuits, and a value N is defined based on a number of NRZ input voltage signals received by a number of the plurality of parallel coupled input converter circuits and based on relative strengths of the plurality of parallel coupled corresponding input converter circuits.

In yet another example, a data link circuit is provided. The data link circuit includes a transmitter circuit, a receiver circuit and a transmission line or channel. The transmitter circuit is configured to: receive a plurality of input non-return-to-zero (NRZ) voltage signals; convert the input NRZ voltage signals into corresponding current signals; and generate a PAM-N signal as an output voltage signal based on the plurality of current signals. The receiver circuit is configured to: receive the PAM-N signal from the transmitter circuit; and generate an output PAM-N signal based on processing the received PAM-N signal. The transmission line or channel is configured to convey the PAM-N signal from the transmitter circuit to the receiver circuit. The value N is defined based on a number of the plurality of input NRZ voltage signals received by the transmitter circuit and based on relative weightings of input converter circuits in the transmitter circuit.

BRIEF DESCRIPTION OF DRAWINGS

So that the manner in which the features recited above can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 6A-6F depict termination impedance circuitries for integration into a differential receiver circuitry or for certain implementations of resistors in the receiver or certain single-ended input embodiments.

DETAILED DESCRIPTION

Figure 1:
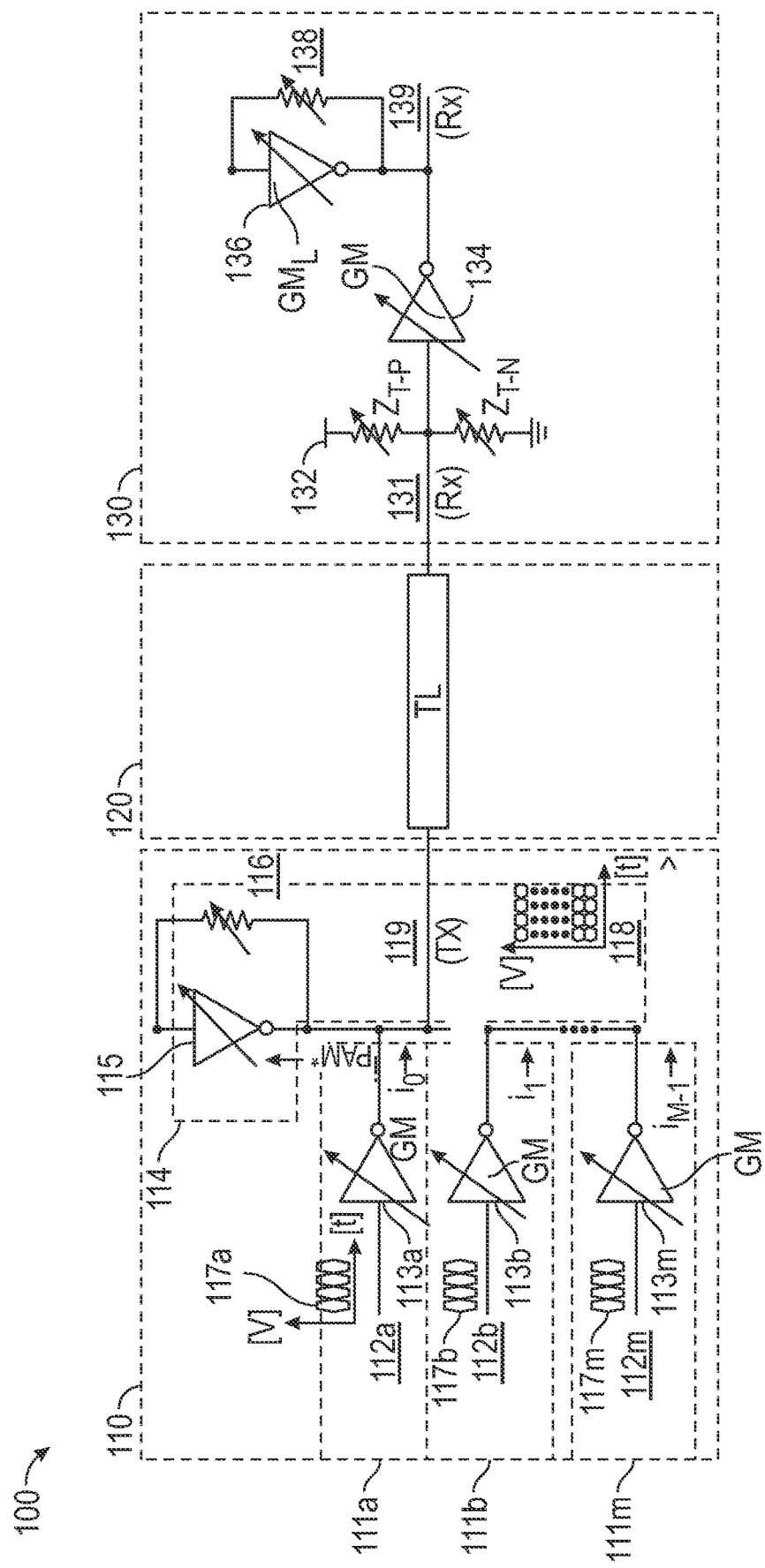
FIG. 1 is a schematic diagram of a representation of an on-chip or inter-chip data link comprising a transmitter circuitry, a channel, and a receiver circuitry, according to an example embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

On integrated chips (ICs), there are often communications between transmitter and receiver components. In some embodiments, these components or other components of the IC have or provide modes and operations that enable testing, such as self-testing of circuits thereon. For example, a wireline or serializer/deserializer block transmits a signal that is conveyed off-chip or on-chip to a receiver and enables analysis and testing of the transmitter of the IC. There is often a large distance separating the transmitter and the receiver (for example, 1 millimeter (mm)) for the data signal to traverse, for either on-chip and off-chip transmissions. Such distances can introduce losses or corruption into the transmitted data. To combat such losses, a transmission line or channel that connects the transmitter circuitry to the receiver circuitry comprises a chain of CMOS inverters or similar components at intervals along the channel. Such CMOS inverter circuits generally enable only a two level signaling.

Recent moves to support greater than 2-level (>2) signaling, such as PAM-4 signaling, complicate transmissions between the CMOS-based transmitter and the CMOS-based receiver via the channel. For example, while CMOS inverters used for signal generation and buffering at the transmitter and receiver are conducive to NRZ, they cannot easily generate, transmit, or buffer greater than 2-level signals, such as PAM-N signals, where N>2.

In some embodiments, the multiple data signals can be transmitted as multiple, individual 2-level signals from the transmitter to the receiver via a number of parallel transmission lines or channels, such that each transmission line or channel is only handling a 2-level signal. Where these transmission lines or channels handle 2-level signals, CMOS components may be used to transmit and re-buffer each of the 2-level signal data streams. Thus, there can be multiple 2-level data streams between the transmitter and the receiver each with its own channel having inverters to amplify/buffer the data stream and correct issues of losses or corruption.

However, such use of multiple data streams may be problematic with respect to combining the individual data streams at the receiver due to potential alignment skewing or delays, and the like. Furthermore, the recombined signal may be converted into a suitable analog signal for the receiver circuitry to process at an input of the receiver circuitry. Thus, using multiple data streams between the transmitter circuitry and the receiver circuitry to transmit a multilevel PAM signal having N levels (for example, a PAM-N signal) may not be practical and involve a high amount of overhead.

In other embodiments, CML may be used for conveying the PAM-N (and similar) signals between the transmitter and receiver. However, for those ICs that leverage the CMOS-based components and signaling, CML is highly inconvenient and problematic, as CMOS components provide a more homogenous design and circuit layout and is also more compatible, for example, having a common mode voltage and power supply voltage, with general CMOS high-speed digital or complementary CMOS analog circuits.

The methods, systems, and apparatus described herein make a multi-level PAM signal (PAM-N signal) at the transmitter using CMOS-based components. By forming the PAM-N signal at the transmitter, the receiver does not have to recombine and/or realign multiple signals and only employs a single transmission line channel (or two transmission line channels in differential implementations) to convey the data stream to the receiver from the transmitter. Also, when transmitting the PAM-N signal between the receiver and the transmitter, using just a simple transmission line interconnect to connect the transmitter and the receiver obviates the need for inverters or similar repeater/buffer components in that part of the signal chain. Furthermore, the data stream generated by the transmitter according to the description herein arrives at the receiver as an analog PAM-N signal that is compatible with the receiver circuits, thereby eliminating any need for the receiver to convert or generate the analog PAM-N signal itself. Furthermore, the transmitter and receiver can employ CMOS-inverter-based circuits (and other CMOS-based components). Furthermore, the CMOS-inverter-based circuits of the transmitter and receiver are within corresponding voltage ranges, enabling the transmitter and the receiver to employ a similar compatible common mode signal to transmit and receive the PAM-N data signal. Such voltage ranges may be compatible for driving signals into the receiver. Thus, the methods, systems, and apparatus herein enable transmission of multilevel data signals for various functions across a chip or to different chips. Details of an exemplary data link corresponding to the systems, methods, and apparatus described herein are provided with respect to FIG. 1.

FIG. 1 is a schematic diagram of a representation of an on- or inter-chip data link 100 comprising a transmitter circuitry 110 (which may be a final stage or close-to-final stage (e.g., $2^{nd}$ last stage) of a transmitter), a transmission line 120, and a receiver circuitry 130, which may be a first stage of a receiver, according to an example embodiment.

Components for any other stages of the transmitter or receiver, while not shown in FIG. 1A, are understood to be included where commonly used for NRZ and/or PAM signaling and data transfer. In some embodiments, the on-chip data link 100 enables communications between different components of a single IC, while in other embodiments, the inter-chip data link 100 enables communications between components of different ICs. In some embodiments, the data link 100 comprises a flexible, compact, low-voltage, and ultra-high-speed on-chip data link for serial PAM-N signalling using CMOS-inverter-based circuitries.

The transmitter circuitry 110 comprises a plurality of parallel input circuitries 111a-111m, where m is an integer value representing an integer number of corresponding components. Each input circuitry 111 comprises a corresponding NRZ input signal 112 that receives and conveys a 2-level voltage signal, such as an NRZ or PAM-2 signal. A representation of each 2-level voltage signal, with respect to time, is shown in representations 117a-117m.

Each NRZ input signal 112 may be one of M data streams that correspond to a decomposition of a data sequence received from another stage of the transmitter. In some embodiments, each of the M data streams is constructed or encoded in a particular way so that a weighted summation of the individual M data streams provides a decipherable and decodable multi-level signal.

Each input circuitry 111 provides the input voltage from the NRZ input signal 112 to a bank of one or more inverters configured as a voltage-to-current (V-to-I) converter 113. The V-to-I converter 113 may comprise a mildly or strongly non-linear converter that converts the input voltage to an output current that depends on the input voltage, but with a relationship that may be non-linear. In some embodiments, each of the V-to-I converters 113a-113m comprises a bank of k inverters. The non-linear output current generated by the corresponding V-to-I converter 113 is, however, linearly proportional to the number, k, of inverters, where k can be a different value for each of the M banks of inverters. The total output current generated by the V-to-I converter 113 is a summation of the M individual non-linear currents. Thus the output current has a proportional relationship to the states of the input voltages to the V-to-I converters as well as their relative strengths (corresponding to an amount of current provided by each V-to-I converter 113) of each of the M inverters in the V-to-I converter 113.

In some embodiments, the V-to-I converter 113 comprises a complementary metal-oxide-semiconductor (CMOS) inverter V-to-I, where corresponding components that form the CMOS inverter are CMOS-based components. Thus, for the parallel arrangement of input circuitries 111a-111m, a corresponding number of corresponding current signals are generated and output by the input circuitries 111a-111m.

The transmitter circuitry 110 further comprises a combiner or summation portion 114. The combiner portion 114 comprises one or more current-to-voltage (I-to-V) converter banks that form an impedance. The impedance can be created by various components. In some embodiments, the impedance comprises a resistor terminated to a low impedance common mode voltage. In other embodiments the impedance comprises one or more I-to-V converters 115 and a resistor 116, as shown in FIG. 1. The one or more I-to-V converters 115 may comprise a CMOS inverter I-to-V converter 115, where corresponding components that form the CMOS inverter are CMOS-based components, and the resistor 116 may be an explicit resistor of passive type or CMOS type or passive/active hybrid type or other type—or may be an implicit resistance, such as a wire chosen to either implement a desired resistance or to approach a short circuit (for example, connected with a low ohmic connection).

The combiner portion 114 combines or sums the current signals generated and output by the input circuitries 111a-111m to create, for example, a linear pulse amplitude modulated signal with N or more levels (PAM-N signal, where N is a positive integer value). The M weighted output currents generated by the input circuitries 111a-111m are sent to an impedance created by the I-to-V converter 115. In some embodiments, the weighting is due to one or more of the number of inverters in the bank of k inverters or how many of inverters are enabled if the inverters have enable/disable capability (for example, "en" and "enb" signals in FIG. 2C or FIG. 2E) or have tunable bias voltages (for example, "biasp" and "biasn" signals in FIG. 2D or FIG. 2F). The I-to-V converters 115 may effectively be a well-controlled impedance based on a configuration or biasing of the I-to-V converters 115 in conjunction with the resistor 116. An $i_{PAM}$ output current is sent or fed into drains of the I-to-V converters 115 (for example, the output current $i_{PAM}$ enters the drains of transistors forming the I-to-V converters 115, thus utilizing a drain-source impedance of the transistors to create an impedance). This impedance may convert the output current $i_{PAM}$ to a corresponding voltage signal communicated via the transmission line 120. The I-to-V converter 115 may have a resistance of approximately $1/(\Sigma gm_L)$, where $\Sigma gm_L$ is the sum of transconductances of inverters forming the I-to-V converter 115, where the I-to-V converter 115 is created by the bank of P inverters coupled in parallel, similar to the V-to-I converters 113a-113m, described above. The number P of inverters of the I-to-V converter 115 may be determined based on the impedance (i.e. resistance) desired or to be created. The resistance/impedance may be inversely proportional to a number of inverters in parallel. In some embodiments, the resistance/impedance is determined based on a target swing/voltage V and the output current $i_{PAM}$ based on (R=V/I). In some embodiments, the resistance/impedance can be determined based on a bandwidth, V based on signal swing requirements, and the $i_{PAM}$ output current to achieve these values ($i_{PAM\_total}=V_{swing\_max}/R$). The I-to-V converter 115 converts the total summed current to a voltage in a linear fashion. Specifically, the I-to-V converter 115 converts the $i_{PAM}$ current (which is a sum of the M non-linear currents output from the V-to-I converters 113a-113m) to a voltage such that the output voltage is approximately linearly proportional to the input voltage states of representations 117a-117m and the number, k, of inverters (those of which are enabled) within each corresponding bank of inverters of the I-to-V converters 113a-113m.

The resistor 116 connects the input and output of the I-to-V converter 115, which enables the I-to-V converter 115 to operate as a controlled $1/(\Sigma gm_L)$ impedance. The resistor 116 can be a parasitic metal resistance, a passive resistor, or constructed of linear metal-oxide-semiconductor (MOS) or a hybrid passive/CMOS "resistor". In some embodiments, the resistor 116 is tunable in conjunction with parasitic (or deliberately added) capacitance and the I-to-V converter 115. This may enable the resistor 116 to emulate an inductor (for example, to become an "active inductor"), which can enable bandwidth extension of and/or peaking into a frequency response of the transmitter circuitry 110. Such bandwidth extension and/or peaking can benefit performance and/or counteract high frequency losses in, for example, the transmitter or receiver. In some embodiments, an active or passive transmitter inductor or the transmission line could enable programmable peaking in the frequency response to cancel channel or transmission line losses.

A representation of the multi-level, PAM-N signal generated by combining the outputs of the input circuitries 111a-111m, with respect to time—in an "eye diagram" format, is shown as representation 118. The representation 118 includes multiple discrete individual levels, which may or may not be equal to the number N in the PAM-N signaling scheme depending on how a transmitter circuitry datastream is encoded or arranged. Multiple unit intervals (UIs) of time (also known as symbol intervals) are shown. Each voltage level of the representation 118 corresponds or is due to the multiple possible combinations of the 2-level signals of the eye diagram representations 117a-117m of the input circuitries 111a-111m, which control the states of the inverters 113. Thus, when there are two 2-level signals corresponding to input signals 112a and 112b, the resulting multi-level signal generated by the combiner portion 114 can be a 4-level signal, corresponding to the possible combinations of the states of the two 2-level signals (2-levels from the input signal 112a plus the 2-levels from the input signal 112b). For example, if the transmitter circuitry 110 is configured for PAM4, the 2 input signals of the input circuitries 111 can create 4 output signals. However, other coding schemes, PAM schemes, and arrangements of the transmitter circuitry 110 may use 2 signals to generate, for example, 3 signal levels. Furthermore, inter-symbol interference ("ISI"), or arrangements of the transmitter circuitry 110 to cancel out certain effects or introduce filters, may cause or result in additional voltage levels.

In some embodiments, for each 2-level signal input into one of the input circuitries 111a-111m, the resulting multi-level signal generated by the combiner portion 114 can be related to the number M of 2-level signals input into the transmitter circuitry 110. For one possible binary weighted embodiment of the PAM-N transmit signaling scheme (binary weighting of the V-to-I input circuitries 111a-111m), a number of possible levels N of the transmitted PAM signal may be defined by the number of input signals in the following way: $N=2^M$ (for example, PAM4 has $N=2^2=4$ levels (from 2 input NRZ streams), PAM8 has $N=2^3=8$ levels (from 3 input NRZ streams), and so forth.

The diagram of the transmitter circuitry 110 also shows the currents ($i_0$-$i_{M-1}$) generated by each of the input circuitries 111a-111m based on the respective NRZ input signals 112a-112m. These individual currents from the input circuitries 111a-111m are combined by the combiner portion 114 to create the aggregate current $i_{PAM}$. For example, the current $i_{PAM}$ is defined by:

$$i_{PAM} = \sum_{0}^{M-1} i_j = \sum_{0}^{M-1} (V_j \times GM_j),$$

where each $V_j$ is the voltage or voltage state j of NRZ input voltage streams 112a-112m. The output voltage corresponding to the output PAM-N signal 119 is defined by $$V_{out} = V_{PAM} = \left( \frac{1}{\sum_{0}^{P-1} GM_L} \right) \times \sum_{0}^{M-1} i_j.$$

In some embodiments, transmitter circuitry 110 provides a source impedance $Z_s$ for the transmission link 100. The impedance $1/(\Sigma gm_L)$ of the V-to-I converter 115 may determine the source impedance $Z_s$ seen by the transmission line 120. Where the transmission line 120 has a characteristic impedance $Z_0$, the source impedance $Z_s$ can be a transmitter circuitry 110 termination impedance. The transmitter circuitry 110 termination impedance may be used to control a voltage and power transfer into the transmission line 120 as well as control any reflections caused by mismatch between the source impedance $Z_s$ of the transmitter circuitry 110 and the transmission line characteristic impedance $Z_0$.

In some embodiments, the generated PAM-N signal 119 is generated as an analog voltage signal. One or more of the V-to-I converters 113a-113m and the I-to-V converter 115 can be configured for limited flexibility or to operate as a digital to analog converter (DAC). Where one or more of the V-to-I converters 113a-113m and the I-to-V converter 115 operate as a DAC, the V-to-I converters 113a-113m or the I-to-V converter 115 may operate as a flexible DAC (having appropriate NRZ input streams), where the DAC may be binary weighted, thermometer weighted, or a combination thereof (for example, operating as a segmented DAC), thus allowing flexibility for different coding or modulation schemes, and/or different signal processing schemes. For some DAC embodiments, the NRZ input signals 112a-112m can be encoded to achieve modulation schemes where every second sample is encoded such as to achieve a non-integer number of bits per Symbol interval (i.e. per unit interval (UI)) (e.g. PAM-6).

Figure 3A:
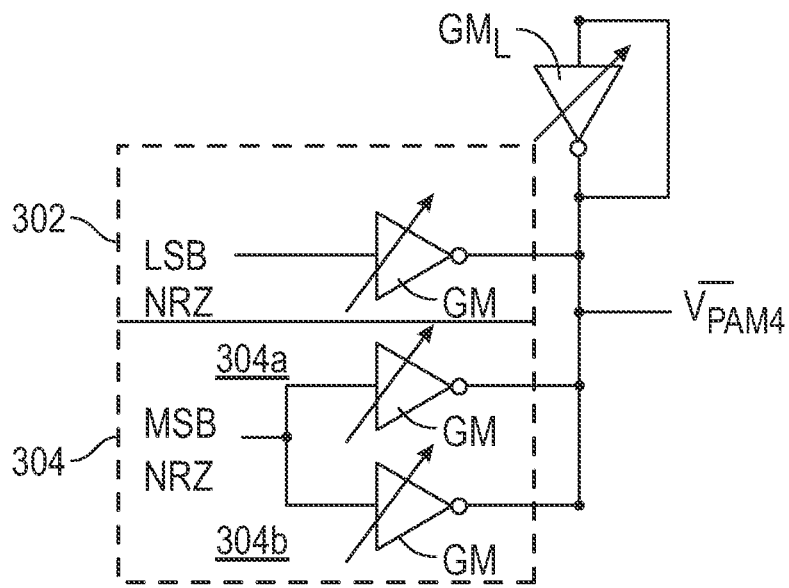
FIGS. 3A-3I depict alternative arrangements of components of the transmitter circuitry and/or the receiver circuitry of FIG. 1, according to exemplary embodiments.

In some embodiments, the V-to-I converters 113a-113m and the I-to-V converter 115 can be extended to form one or more of an infinite impulse response (IIR) filter, a finite input response (FIR) filter, and/or a sub-unit interval (sub-UI) filter, for example, in the combiner portion 114 using one or more of the NRZ input signals 112a-112m, weightings, and/or delays between the NRZ input signals 112a-112m. In some embodiments, the output of the transmitter circuitry 110 generates the PAM-N signal 119. In some embodiments, the transmitter circuitry 110 generates an output current signal instead of the PAM-N voltage signal 119. In some embodiments, the transmitter circuitry 110 may comprise a structure as shown in FIG. 3A below, which represents a PAM4 implementation or a binary weight DAC. In some embodiments, the combiner portion 114 may combine UI-delayed and/or multi-UI-delayed and/or sub-UI-delayed weighted copies of the NRZ input signals 112a-112m or arbitrary NRZ input signals 112 to form an FIR feedforward filter or a feedback filter. In the DAC embodiment introduced above, this may provide flexibility for channel equalization and/or reflection cancellation.

In some embodiments, one or more components of the transmitter circuitry 110 can be hard-coded or programmed with weightings. In some embodiments, a DC gain and/or swing for the transmitter circuitry 110 is programmable via programming of one or more of the V-to-I converters 113a-113m and/or the I-to-V converter 115. In some embodiments, the impedance of the transmitter circuitry 110 can be programmed via programming of the I-to-V converter 115 to tune the relationship between the gain, the bandwidth, and to tune the impedance matching to the transmission line 120 of the transmitter circuitry 110. In some embodiments, an output filtering and/or a peaking of the transmitter circuitry 110 can be programmed by activating or deactivating one or more of the V-to-I converters 113a-113m or the I-to-V converter 115. For example, activating and deactivating the V-to-I converters 113a-113m or the V-to-I converter 115 may comprise deactivating the V-to-I converters 113a-113m or the V-to-I converter 115 in tandem to lower bandwidth while maintaining swing. In some embodiments, such activation or deactivation may occur at an individual inverter level where the V-to-I converters 113a-113m comprise multiple banks or levels of inverters, as shown in FIG. 1. In some embodiments, the peaking of the transmitter circuitry frequency response can be programmed by programming the resistor 116 (for example, adjusting the resistance of the resistor 116) and/or the programming of an additional explicitly added programmable capacitance that connects to this resistor.

In some embodiments, the PAM-N signal 119 can be programmed with weighting and/or have a number of levels in the corresponding multi-level signal reduced by making NRZ input signals 112 into corresponding input circuitries 111 identical or tristating one or more of the V-to-I converters 113a-113m. To tristate means to disable a block such that an output of the block is in a high impedance state while also being weakly driven. For example, different V-to-I converters 113a-113m can be programmed to have different strengths or weights and/or the input NRZ signal can be adjusted. For example, and with reference to FIG. 3A, an output PAM-N signal (represented by a PAM-4 signal $V_{PAM4}$) uses two NRZ signals (and corresponding input circuitries 111), where the two NRZ signals' two voltage levels are set to be identical and where a first of the two NRZ signals is purposed as a least significant bit (LSB) input signal and the other is purposed as a most significant bit (MSB) input signal. A corresponding MSB output current signal weighting is twice the weighting of the LSB output current signal by duplicating the MSB branches, which gives the MSB output twice the current weighting (and, therefore, twice the eventual voltage contribution) as a corresponding LSB output.

The PAM-N signal 119 may be passed to the transmission line 120 for conveyance to the receiver circuitry 130, which receives an input PAM-N electrical signal 131. In certain embodiments, the transmission line 120 comprises a metal interconnect transmission line, such as a metal wire made up of one or more metal layers, and corresponding vias that connect one or more of the layers, connected to transmit data from the transmitter circuitry 110 to the receiver circuitry 130. The transmission line 120 can take several forms or be categorized in various ways.

For example, and as introduced above, the transmission line 120 may have a well-defined characteristic, or "instantaneous impedance", $Z_0$. The transmission line 120 may have an appreciable inductive and capacitive behavior in the frequency range of interest and have a delay (or group delay) that is of the same order magnitude as a rise/fall time of the PAM-N signal 119 passed into the transmission line 120 for conveyance to the receiver circuitry 130. In some embodiments, the transmission line 120 is one of a resistance and capacitance (RC) dominated transmission line, a capacitance (C) dominated transmission line, a resistance (R)-dominated transmission line, an inductance and capacitance (LC) dominated transmission line, or a resistance, inductance, and capacitance (RLC) dominated transmission line.

In certain embodiments, the transmission line 120 is a differential pair wire, such as in the case of differential signaling. In some embodiments, the wires or conductors of the transmission line 120 provide or include a return path or shield, comprising adjacent conductors that return an AC current back to the transmitter circuitry 110 and/or protect the voltage signals conveyed from the transmitter circuitry 110 to the receiver circuitry 130 via the transmission line 120 from being corrupted by other signals. In some embodiments, such wires or conductors of the return path help define the characteristic impedance, for example, where the transmission line 120 has a well-defined characteristic impedance $Z_0$. In some embodiments, the transmission line 120 can comprise an optical interconnect. In such embodiments, the electrical signal output by the transmitter circuitry 110 as the PAM-N signal 119 is converted to an optical signal by an electrical-to-optical converter circuit—placed between the transmitter circuitry 110 and the transmission line 120, and is then sent through the optical interconnect 120, and then received by an optical to electrical converter circuit at the receiver circuitry, which converts the PAM-N optical signal into the input PAM-N electrical signal 131. In some embodiments, the transmission line 120 enables the transmitter circuitry to transmit the PAM-N signal 119 to the receiver circuitry 130 that is off-chip or on a different IC, whereby the transmission line 120 is an off-chip channel.

The transmission line 120, as depicted, provides the PAM-N signal 119 to the receiver circuitry 130 as the input PAM-N signal 131.

The receiver circuitry 130 may buffer, and/or amplify, and/or filter, and/or equalize the input PAM-N signal 131 and provide an output PAM-N signal 139. In some embodiments, the receiver circuitry 130 may comprise inverters or circuitries of any of the topologies described below with respect to FIGS. 2A-2F, FIGS. 3B-3D, FIGS. 3F-3I, or FIG. 4A or 4B or the differential topology of FIG. 3E, or the like. In some embodiments, the receiver may comprise additional subsequent stages or circuits.

In some embodiments, the receiver circuitry 130 includes a receiver termination $Z_T$. In some embodiments, the receiver circuitry 130 includes tristate functionality, corresponding to an ability to activate or deactivate an input leg or an output of the receiver circuitry 130, such as with an isolation function, in the case of multiple paths entering the receiver circuitry 130, as shown with reference to FIGS. 3C and 3D. In such multi-path cases, a signal for each path can be effectively connected and disconnected from the receiver circuitry 130, such that the receiver circuitry 130 will not receive the corresponding signal, by methods such as, but not limited to, enabling/disabling the corresponding inverters, enabling series coupled switches, and the like. In some embodiments, the multiple paths provide signals from a different transmitter than the transmitter 110 (or multiple different transmitters if there are multiple tristate-able elements in parallel) on the same chip. In some embodiments, the multiple paths may be from one or more transmitters on a different chip, where the corresponding signal enters through another receiver signal chain, for example, starting at the chip bump or pin.

In some embodiments, the receiver circuitry 130 termination impedance $Z_T$ can comprise various structures, such as (but not limited to) circuit embodiments shown with reference to FIGS. 5A-5E, for single ended input embodiments, or FIGS. 6A-6F for differential signal input embodiments.

The receiver circuitry 130 optionally includes termination impedance circuitry 132. The termination impedance circuitry 132 may be used to terminate (or match to) an on-chip LC-dominated transmission line 120, for example, where group delay is of the same order as rise/fall times. In some embodiments, the termination impedance circuitry 132 comprises inverters having inputs connected to corresponding outputs via, for example, a short circuit or a resistor, which may help maintain a common mode that is compatible with the receiver—and may also help maintain a ratio-metric-defined gain/swing over process, voltage, and temperature (PVT). Following the termination impedance circuitry 132, the receiver circuitry 130 includes a first inverter 134 and a second inverter 136 in parallel with a resistor 138. In some embodiments, when the transmitter circuitry 110 generates the output current signal transmitted to the receiver circuitry 130, the receiver circuitry 130 may include the termination impedance circuitry 132 to convert the received current signal to a voltage signal at an input of the receiver circuitry 130. In some embodiments, the receiver circuitry 130 provides detection and further buffering and/or processing of the input signal received from the transmission line 120. In some embodiments, the receiver circuitry 130 forms a buffer and/or amplifier, where the first inverter 134 controls a gain/swing and the second inverter 136 controls gain, swing, and bandwidth, and the resistor 138 adds the active inductor property to the impedance $1/gm_L$. In some embodiments, the resistor 138 can be a short circuit (for example, with a low ohmic connection) which removes the active inductor property. In other embodiments, the receiver circuitry 130 can be a circuitry such as FIG. 4A and/or FIG. 4B as a chain consisting of circuitries such as the receive circuitry 130 and/or FIGS. 4A and 4B and/or other circuitries. For example, there may be an analog-to-digital converter (ADC) as part of an analog portion of the receiver circuitry 130—and going further, there may be additional digital signal processing (DSP) after the analog to digital conversion.

Figure 4A:
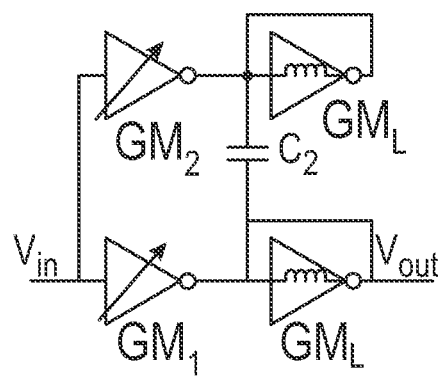
FIGS. 4A and 4B depicts potential continuous time linear equalizer (CTLE) circuitries that can be integrated into the transmitter circuitry and/or the receiver circuitry of FIG. 1, according to an example embodiment.

In some embodiments, a DC gain and/or swing and/or filtering ability of the receiver circuitry 130 is programmable, for example, via programming of one or more of the first and second inverters 134 and 136 (or other various elements in the cases of 130 being comprised of different circuits, e.g. FIGS. 4A and/or 4B). In some embodiments, a DC impedance of a termination resistance may be programmable to trade a gain, bandwidth, and/or a matching impedance to the transmission line impedance. In some embodiments, an output filtering and/or a peaking of the receiver circuitry 130 can be programmed by activating or deactivating one or more of the first and second inverters 134 and 136. For example, activating and deactivating the first and second inverter 134 and 136 may comprise deactivating the first and second inverters 134 and/or 136 in tandem to lower bandwidth. In some embodiments, such activation or deactivation may occur at an individual inverter level where the first and/or second inverters 134 and 136 comprise multiple banks or levels of inverters, as shown in FIG. 1. In some embodiments, the peaking of the receiver circuitry frequency response can be programmed by programming the resistor 138. In others, peaking and other filtering can be employed through continuous time linear equalizer circuits, such as those presented in FIGS. 4A and/or 4B.

As introduced above, the V-to-I converters 113a-113m and the I-to-V converter 115 of the transmitter circuitry 110 and the first and second inverters 134 and 136 of the receiver circuitry 130 are implemented as CMOS components. In some embodiments, the CMOS components are constructed using one or more of CMOS inverters, CMOS switches and/or resistors (passive and/or active), capacitors (passive and/or active), and/or inductors (passive and/or active). The transmitter circuitry 110 may be a compact, homogenous combiner/summer that sums the individual NRZ input signals 112a-112m to create the PAM-N analog voltage signal 119. The transmitter circuitry 110, in its combiner/summer/DAC configuration, may create a common mode and swing compatible with CMOS inverter circuits, including CMOS inverter circuit embodiments such as those shown in FIGS. 2A-2F. Such CMOS inverter circuit variations may be used in various topologies, such as CMOS buffers, CMOS inverter-based CTLEs, transimpedance amplifiers, and the like. In some embodiments, the transmitter circuitry 110 described above further includes an inherent source termination impedance, by virtue of 114, for driving the transmission line 120. In some embodiments, V-to-I converters 113a-113m and the I-to-V converter 115 and the first and second inverters 134 and 136, respectively, comprise a high-bandwidth and are configured to drive (for the converters of the transmitter circuitry 110) and/or terminate (for the inverters of the receiver circuitry 130), which reduces a number of repeaters or parallel data buses used for the transmission line 120 between the transmitter circuitry 110 and the receiver circuitry 130. In some embodiments, a tristate-able inverter (such as shown in FIG. 3C or switches in FIG. 3D) provide a manner of injecting or tapping into the receiver circuitry 130. The tristate-able inverter may be co-located in the receiver circuitry 130 and may be one path, or one of multiple paths or ways to inject a signal into the receiver circuitry 130. As shown in FIG. 3B, there is no alternate path for the receiver circuitry shown, so there is one path (i.e., Vin (RX)) between the transmitter and this receiver circuitry in FIG. 3B. In FIG. 3C or FIG. 3D, multiple injection points for signals (i.e., $V_{in}$ (RX) and $V_{in}$ (other)) from one or more transmitter circuitries into the receiver circuitry are shown. Thus, the injection point can be selected from different paths—whether through use of independently tristate-able inverter GM circuits (e.g. by enabling GM-O or GM inverter GM circuits) in the case of FIG. 3C, or independently controlled switches in the case of FIG. 3D (e.g. enabling SW-O or SW switches). An additional embodiment may entail concurrently enabling both paths and combining each path's output current in the gmL impedance.

In some embodiments, the data link 100 enables an on-chip or inter-chip internal loopback function where a full-rate or lower rate signal can be sent from the transmitter via the transmitter circuitry 110 to the receiver via the receiver circuitry 130 and the transmission line 120. The internal loopback enables testing of both the transmitter and the receiver when located on the same chip or different chips. The internal loopback may enable faster and more efficient communication of, for example, PAM-N signals and to enable self-contained on-chip testing. This circuitry may be full rate and PAM-N capable, which, if PAM-N is the application, allows full testing of all or some of the circuits and circuit properties that are employed for PAM-N data transmission at full rate (or lower rates).

In some embodiments, the data link 100 enables on-chip or inter-chip transfer of data. For example, the data link 100 may enable movement of data between components of a single chip or between components of different chips.

In some embodiments, the transmitter circuitry 110 includes, for the resistor 116, a triode resistor. The triode resistor can be active or passive, or a combination of both passive and active components. In some embodiments, a triode resistor 116 can comprise programmable components and/or be CMOS, PMOS, or NMOS based in a shunt or parallel configuration. In some embodiments, the resistor 116, whether the triode resistor or another resistor, can comprise one of the circuit structures shown in FIGS. 6A-6F. In certain embodiments, the resistor 116 comprises or is combined with a component that introduces a capacitance, such that the resistor 116 and the capacitance can be used to shape a frequency response for the corresponding output signal. For example, the resistor 116, and the corresponding implicitly or explicitly added capacitance, can be used to adjust the bandwidth extension and/or peaking of an output signal generated by the transmitter circuitry 110. The receiver circuitry 130 includes the resistor 138, which may correspond to the resistor 116 of the transmitter circuitry 110. Accordingly, the variations and configurations available for the resistor 116, as discussed above, similarly apply to the resistor 138 of the receiver circuitry.

In some embodiments, while the data link 100, and the circuitries thereof, are shown as having a single-ended architecture, a pseudo differential operation could be introduced by duplicating the single-ended architecture. For example, in certain embodiments, such as high bandwidth and/or high-performance embodiments and systems, the differential architecture may be employed. Such systems may comprise one or more of: high speed requirements, high Signal-to-Noise-Ratio (SNR) requirements, resilience to power supply noise, high linearity, and the like. Many systems may employ the pseudo differential operation, although some applications may employ single-ended operation.

FIGS. 2A-2F depict alternative schematic blocks that can be integrated into the inter-chip data link of FIG. 1 while maintaining similar properties and results, according to exemplary embodiments. The alternative schematic blocks shown may implement various CMOS-inverter-based topologies for the transmitter circuitry 110 and receiver circuitries 130. Benefits of such embodiments shown may include one or more of tunability, configurability, or adaptably, and support for complex functions, such as tristating and/or multiplexing. In some embodiments, choosing to have or not have such embodiments in each part of the circuit may increase or decrease a tunability or complexity (for example, how a signal such as an enable or bias signal is generated) and so all, some, or none of the corresponding inverters may be programmable depending on needs of a particular sub-circuit within the transmitter circuitry and the receiver circuitry.

Figure 2A:
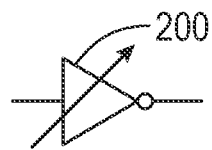
FIGS. 2A-2F depict schematic blocks for alternative inverters that can be integrated into the inter-chip data link of FIG. 1 while maintaining similar properties and results, according to exemplary embodiments.
Figure 3B:
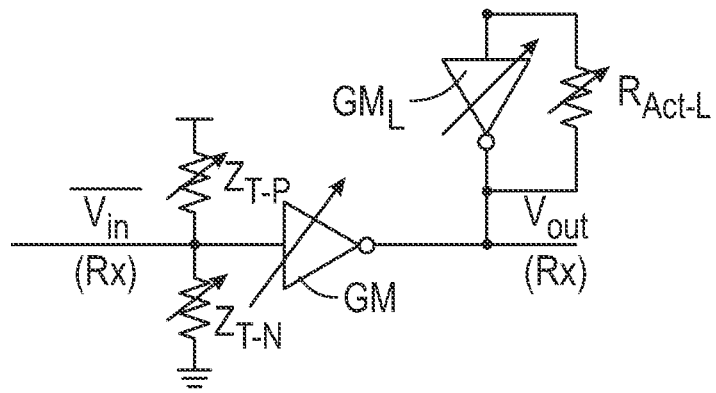
Figure 3C:
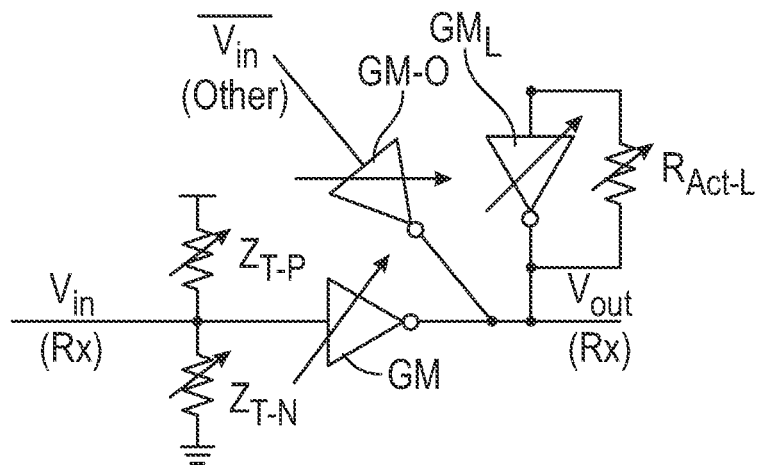
Figure 3D:
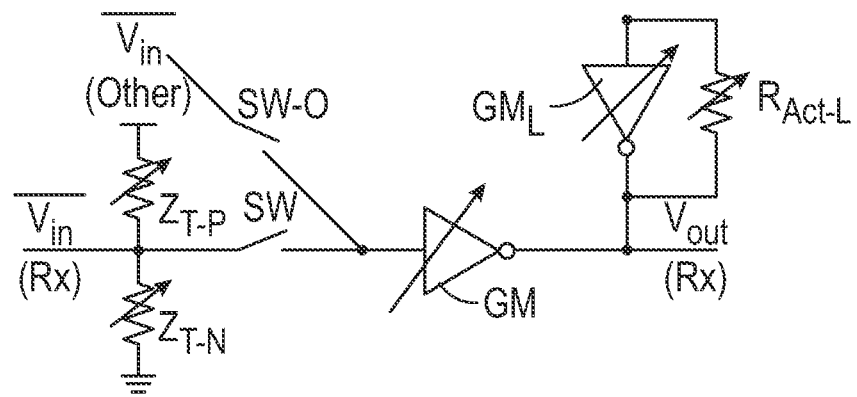

For example, the FIG. 2A shows an inverter schematic comprising a single inverter 200, which may correspond to a single CMOS inverter representation of the inverter banks shown in FIG. 1, for example, with reference to the V-to-I converters 113a-113m, the I-to-V converter 115, and the first and second inverters 134 and 136. The arrow going through the single inverter 200 in the inverter schematic indicates that the single inverter 200 is programmable (for example, can be turned on or off in a digital fashion, or tuned in an analog fashion).

Figure 2B:
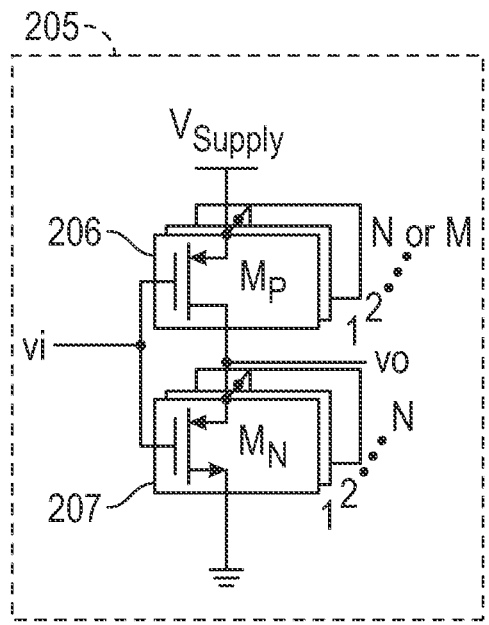

FIG. 2B depicts a schematic 205 of CMOS inverter banks, and could be used for example, for some or all of the inverter banks as shown in FIG. 1. The schematic 205 represents the CMOS inverters of the inverter banks as corresponding PMOS transistors 206 and NMOS transistors 207. Specifically, the schematic 205 comprises X or Y PMOS transistors 206 and X NMOS transistors 207. The depicted schematic 205 of the CMOS inverter generates an output voltage, $V_o$, based on an input voltage, $V_i$—and may furthermore produce, or receive, a current if connected to, or configured as, a low-impedance, respectively. In some instances, independently enabling different numbers of PMOS and/or NMOS transistors 206 and/or 207, respectively, enables adjustment of a relative strength of the PMOS transistors 206 as compared to the NMOS transistors 207.

Figure 2C:
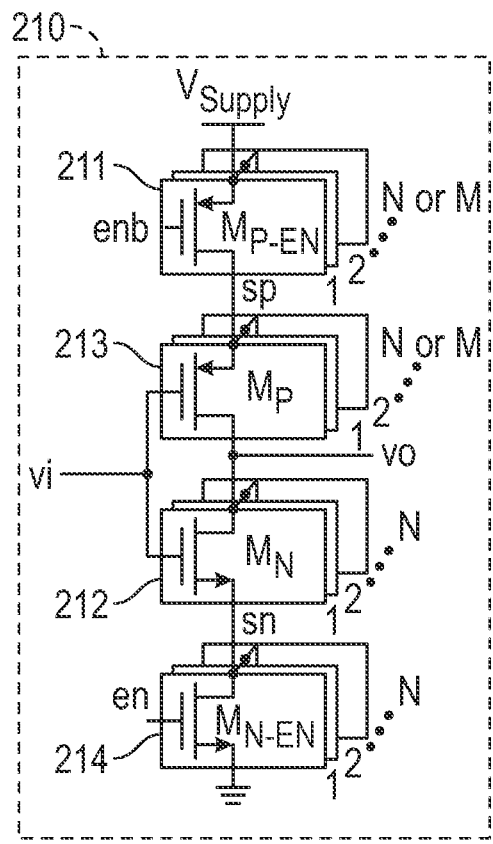

FIG. 2C depicts another schematic 210 of CMOS inverter banks, such as the inverter banks as shown in FIG. 1. The schematic 210 represents the CMOS inverters of the inverter banks as corresponding PMOS enable transistors 211, NMOS transistors 212, PMOS transistors 213, and NMOS enable transistors 214. The schematic 210 provides the CMOS inverter with additional controls compared to the inverter banks of FIG. 2B—in that it allows enabling or disabling a corresponding inverter bank. If CMOS inverters are employed in the components 113, 115, 134, 136, these components can have any of the inverters of any of these banks of inverters independently enabled or disabled by employing independent enable/disable signals. In the schematic 210, the number of PMOS enable transistors 211 and PMOS transistors 213 is determined by the number N or M, while the number of NMOS transistors 212 and NMOS enable transistors 214 is determined by the number N. The PMOS enable transistors 211 and the PMOS transistors 213 may be coupled by respective sp "nets" and the NMOS transistors 212 and the NMOS enable transistors 214 may be coupled by respective sn "nets". The enable and disable transistors (PMOS enable transistors 213 and the NMOS enable transistors 214) provide opportunities to enable and disable individual CMOS inverters or inverter banks and/or tune the corresponding CMOS inverter in a joint or independent fashion. Similar to the inverter schematic 205, the depicted inverter schematic 210 of the CMOS inverter generates an output voltage, $V_o$, based on an input voltage, $V_i$—and may furthermore produce, or receive, a current if connected to, or configured as, a low-impedance, respectively.

Figure 2D:
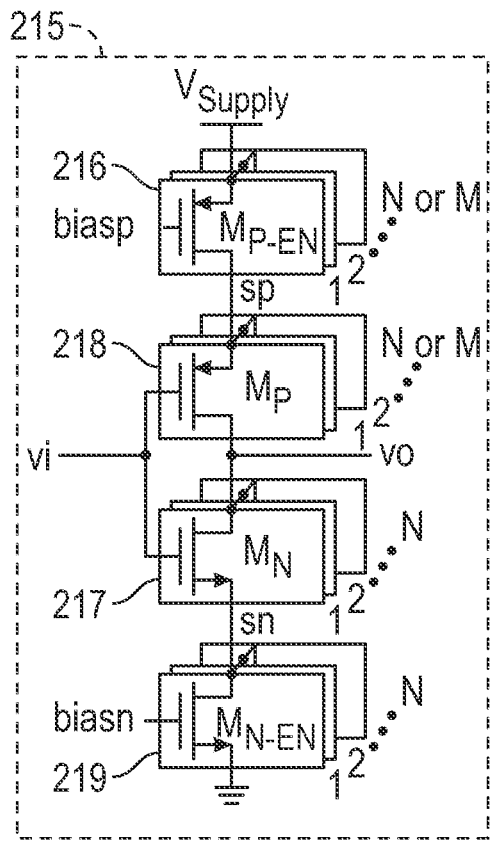

FIG. 2D depicts an inverter schematic 215 of CMOS inverter banks, such as the inverter banks as shown in FIG. 1. The schematic 215 represents the CMOS inverters of the inverter banks as corresponding PMOS bias transistors 216, NMOS transistors 217, PMOS transistors 218, and NMOS bias transistors 219, in a configuration that is similar to that of the FIG. 2C inverter schematic 210. The inverter schematic 215 provides the CMOS inverter with different additional controls over the inverter schematic, including adjusting a biasing of the inverter using analog voltages biasp and biasn which can be generated from some voltage source and/or a voltage DAC. In the inverter schematic 215, the number of PMOS bias transistors 216 and PMOS transistors 218 is determined by a the number N or M, while the number of NMOS transistors 217 and NMOS bias transistors 219 is determined by the number N. The bias PMOS bias transistors 218 and the NMOS bias transistors 219 provide opportunities to bias individual CMOS inverters and/or tune the corresponding CMOS inverter. The PMOS bias transistors 216 and the PMOS transistors 218 may be coupled by respective sp "nets" and the NMOS transistors 217 and the NMOS bias transistors 219 may be coupled by respective sn "nets". Similar to the inverter schematic 205, the depicted inverter schematic 215 of the CMOS inverter generates an output voltage, $V_o$, based on an input voltage, $V_i$.

Figure 2E:
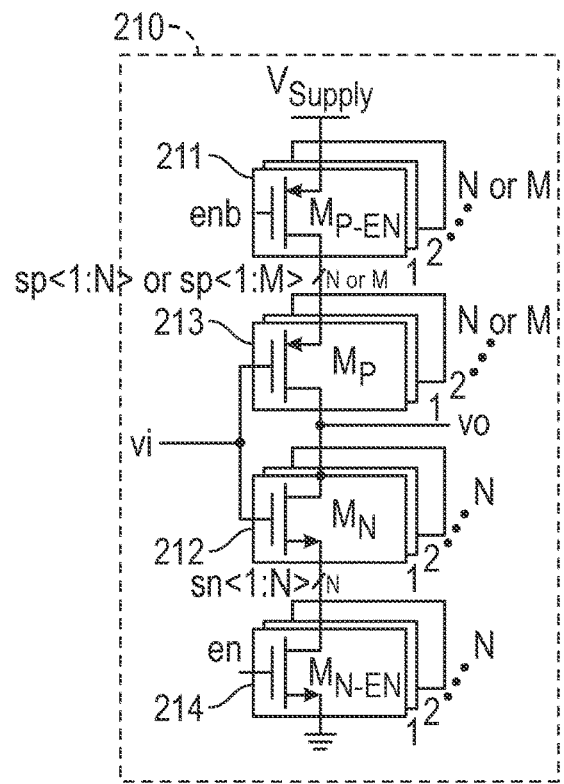

FIG. 2E depicts the schematic 210 of CMOS inverter banks similar to the schematic 210 of FIG. 2C, where the PMOS enable transistors 211 and PMOS transistors 213 are connected via a bus of parallel independent wires instead of the corresponding "sp" and "sn" nets as shown in FIG. 2C. Similarly, the NMOS transistors 212 and the NMOS enable transistors 214 of FIG. 2E are connected via another bus of parallel independent wires instead of the corresponding "sp" and "sn" nets of FIG. 2C. The remaining components of the FIG. 2E may correspond with the similarly numbered and labeled components of FIG. 2C. The corresponding descriptions will not be copied here for brevity.

Figure 2F:
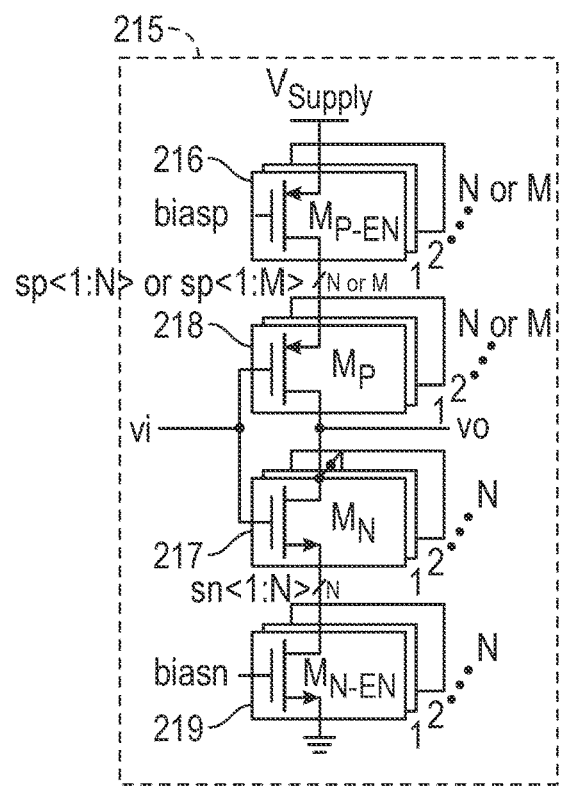

FIG. 2F depicts the schematic 215 of CMOS inverter banks similar to the schematic 215 of FIG. 2D, where the PMOS bias transistors 216 and PMOS transistors 218 are connected via a bus of parallel independent wires instead of the corresponding "sp" and "sn" nets as shown in FIG. 2D. Similarly, the NMOS transistors 217 and the NMOS bias transistors 219 of FIG. 2F are connected via another bus of parallel independent wires instead of the corresponding "sp" and "sn" nets of FIG. 2D. The remaining components of the FIG. 2F may correspond with the similarly numbered and labeled components of FIG. 2D. The corresponding descriptions will not be copied here for brevity.

In some embodiments, the various CMOS inverter structures and schematics can be predominantly or entirely constructed of CMOS transistors. For example, the V-to-I converters 113a-113m, the I-to-V converter 115, and the first and second inverters 134 and 136 of the transmitter circuitry 110 and the receiver circuitry 130 may be constructed from CMOS inverters and/or triode, or linear region, CMOS resistors, as shown in FIGS. 2A-2F.

FIGS. 3A-3I depict alternative arrangements of components of the transmitter circuitry 110 and/or the receiver circuitry 130 of FIG. 1, according to exemplary embodiments. Specifically, FIG. 3A depicts an alternative schematic diagram 300 for the transmitter circuitry 110 in the data link 100 of FIG. 1. The diagram 300 includes an input circuitry 302 configured for a least significant bit (LSB) NRZ signal and input circuitries 304a and 304b that each process a most significant bit (MSB) NRZ signal.

FIGS. 3B-3D depict alternative schematic diagrams for the receiver circuitry in the data link of FIG. 1 to couple or combine or selectively couple an individual signal or multiple signals (from the transmitter or some other location) into a single receiver signal chain. For example, FIG. 3B depicts the receiver circuitry 130 of FIG. 1. In contrast, FIG. 3C depicts a receiver circuitry comprising multiple input legs or paths, where each path has its own bank of inverters. In some embodiments, the different banks of inverters for different legs can be activated in different modes to enable the corresponding input leg's GM or GM-O inverters which feed their output current into the $GM_L$, thus selectively choosing the source which ultimately creates the voltage $V_{out}$, which can then be fed into the input of the subsequent receive circuitry that is connected to $V_{out}$. FIG. 3D depicts a receiver circuitry comprising multiple input legs that all share a single bank of inverters, where each input leg is coupled to the bank of inverters via a corresponding switch. In some embodiments, the different legs or switches can be activated in different modes to enable the corresponding input leg or switch and for the voltage at the input to the switch to be propagated through that switch to control the inverter it feeds so as to further create an output current which is ultimately converted to the voltage $V_{out}$ by the impedance at that point. This output signal $V_{out}$ is then fed to subsequent receive circuitry. In some embodiments, the receiver circuitry can include a buffer, amplifier, and/or CTLE that receives the one or more input legs' output signal. Thus, by using inverters or similar components, individual paths can be selected one path and/or tristated/disabled, thereby achieving a multiplexor function.

Figure 3E:
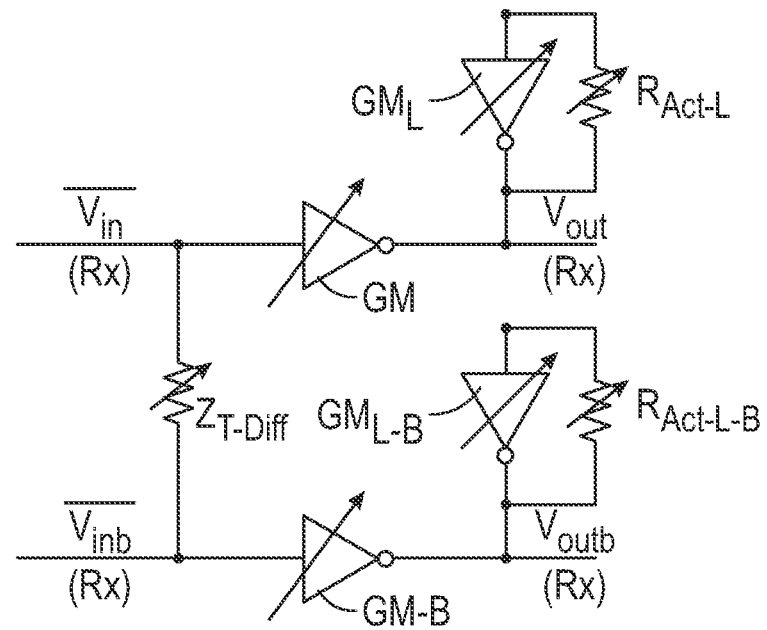

FIG. 3E depicts a schematic diagram for the receiver circuitry in the data link of FIG. 1 in a differential termination.

Figure 3F:
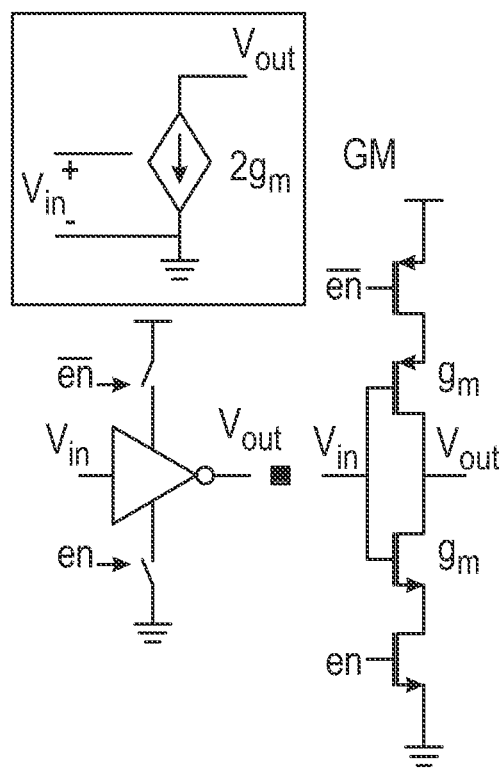
Figure 3G:
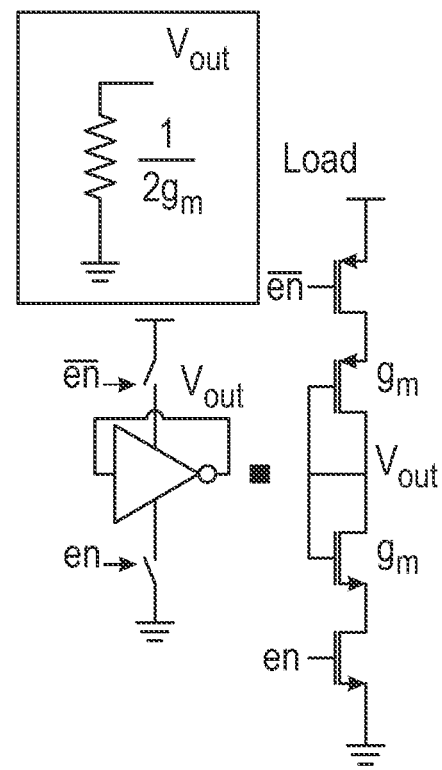
Figure 3H:
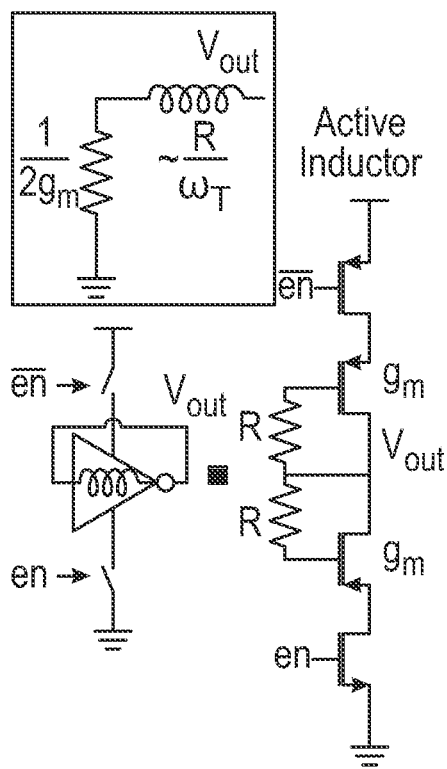
Figure 3I:
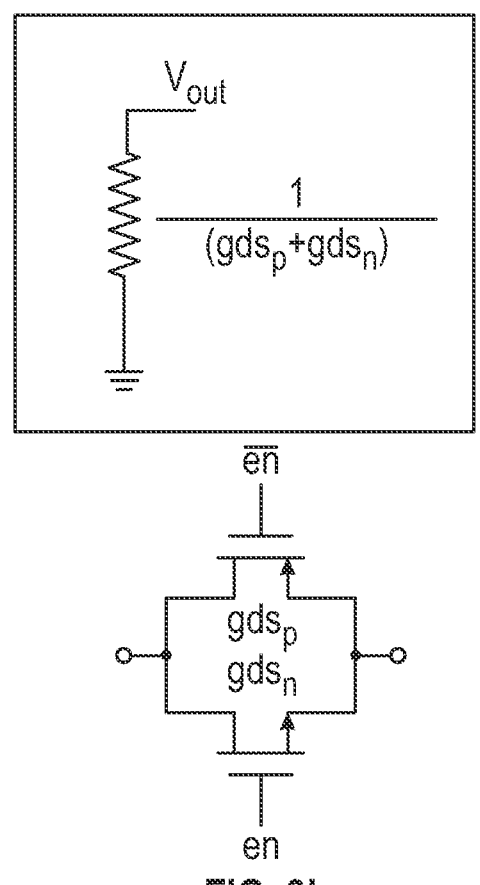

FIGS. 3F-3I depict alternative schematic diagrams for inverter circuits employed in the transmitter and/or receiver circuitries of the data link of FIG. 1. Specifically, the schematic diagrams of FIG. 3F provide details for a configuration of an inverter circuitry that can be used to provide a V-to-I amplifier. The schematic diagrams of FIG. 3G provide details for a configuration of an inverter circuitry that can be used to provide a resistor-like impedance. The schematic diagrams of FIG. 3H provide details for a configuration of an inverter circuitry that can be used to provide an resistor plus inductor like impedance, where the inductor portion comes from what is known to those skilled in the art as an "active inductor". In some embodiments, a combination of these schematic diagrams of FIGS. 3F-3H can be used to create certain circuitry, such as forming a linear inverter circuitry based on connecting the V-to-I amplifier of FIG. 3F with the resistor-like impedance of FIG. 3G. The schematic diagrams of FIG. 3I provide details for a configuration of a circuitry that can be used to provide a triode resistor comprising transistors biased in a linear, or triode, region.

Figure 4B:
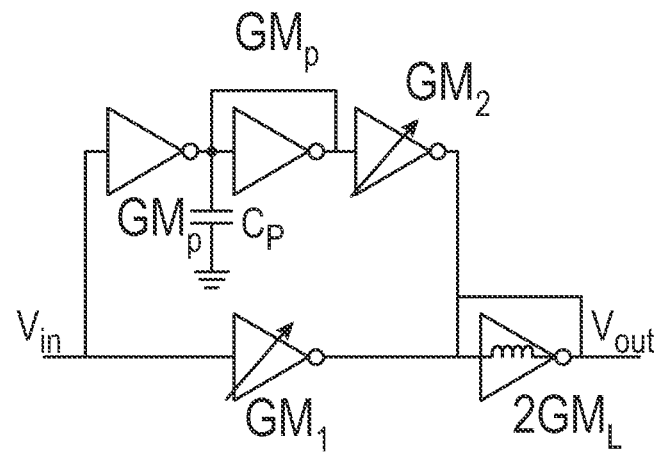
Figure 5A:
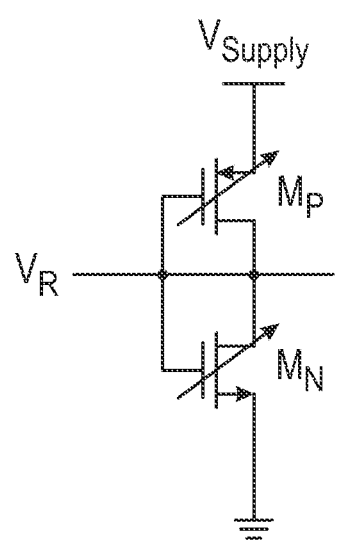
FIGS. 5A-5E depict exemplary termination impedance circuitries for integration into a single-ended receiver circuitry, according to an exemplary embodiment.
Figure 5B:
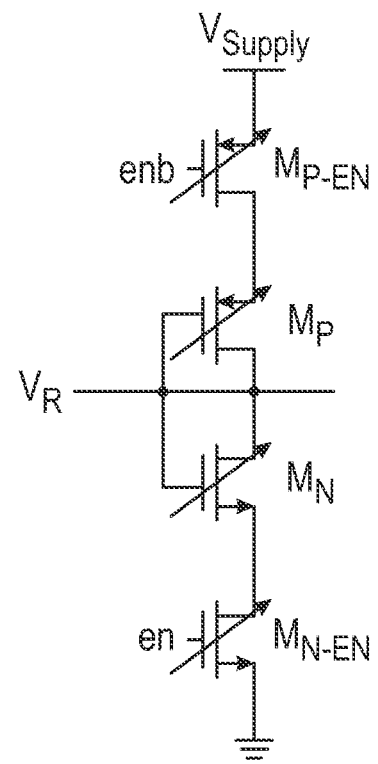
Figure 5E:
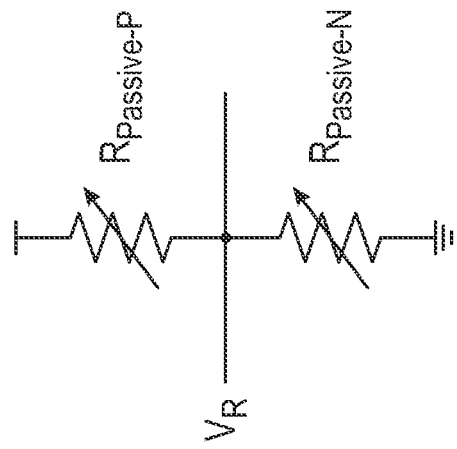
Figure 5D:
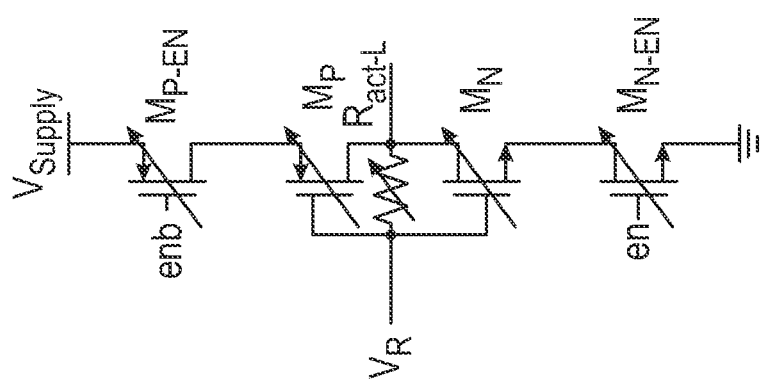
Figure 5C:
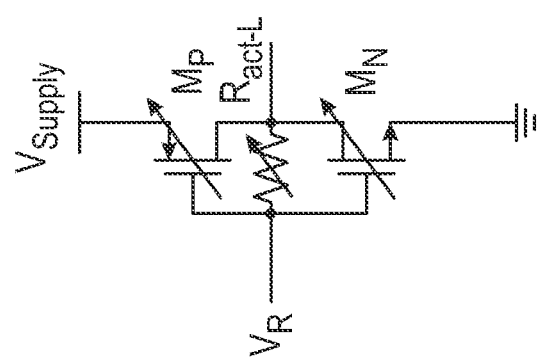

FIGS. 4A and 4B depict potential CTLE circuitries that can be integrated into the transmitter circuitry and/or the receiver circuitry of FIG. 1, according to an example embodiment. The circuitries shown may provide peaking under different conditions and this peaking may be programmable.

FIGS. 5A-5E depict exemplary termination impedance circuitries for integration into a single-ended receiver circuitry, according to an exemplary embodiment. Each of the variations in termination impedance circuitries shown between FIGS. 5A-5E may be programmable (or open circuited) to adjust one or more of a swing, bandwidth, or matching with respect to each other and the transmission line (for example, swing vs. bandwidth vs. matching to the transmission line). In some embodiments, the termination impedance circuitries of one or more of FIGs. 5A-5E may comprise a passive resistor, an active triode resistor that is CMOS, NMOS, or PMOS based), or an inverter circuitry that provides a resistor operation, as shown with respect to FIG. 3G. In some embodiments, the termination impedance circuitry comprises includes a resistor, such as the resistor in FIGS. 5C and 5D, that can form an active inductor that helps reduce any decrease in effective termination impedance that can otherwise occur at a high frequency (e.g. in the GHz range) in the presence of a parasitic capacitance. In some embodiments, adjusting a capacitance (for example, adding a potential implicit capacitance or deliberately adding capacitance) to one of the termination impedance circuitries of FIGS. 5A-5E can provide a frequency-dependent impedance which may be of benefit in some cases.

FIGS. 6A-6F depict termination impedance circuitries for integration into a differential receiver circuitry or for certain implementations of resistors in the receiver or certain single-ended input embodiments.

Figure 7B:
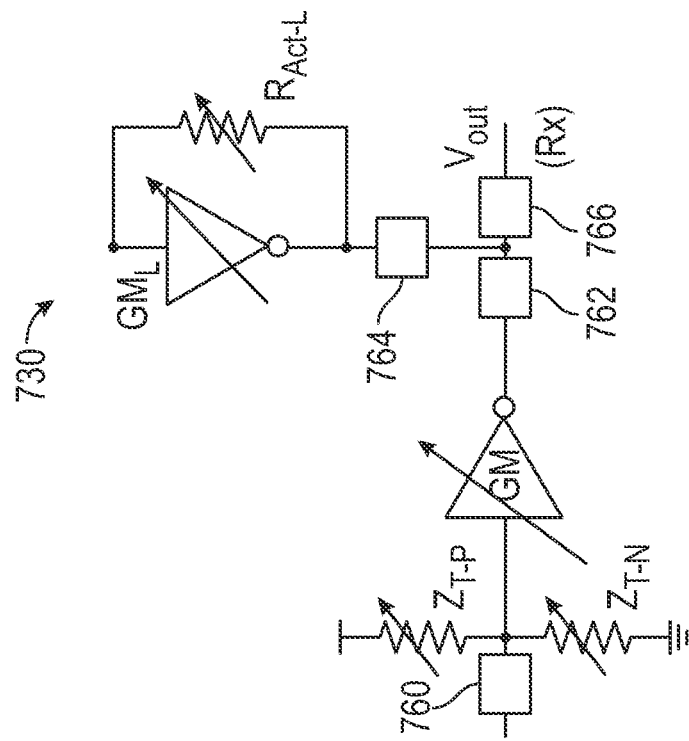
FIGS. 7A and 7B depict an example alternative transmitter circuitry and an example alternative receiver circuitry, respectively, with included inductors at depicted locations of the transmitter and receiver circuitries of FIG. 1 for bandwidth extension.
Figure 7A:
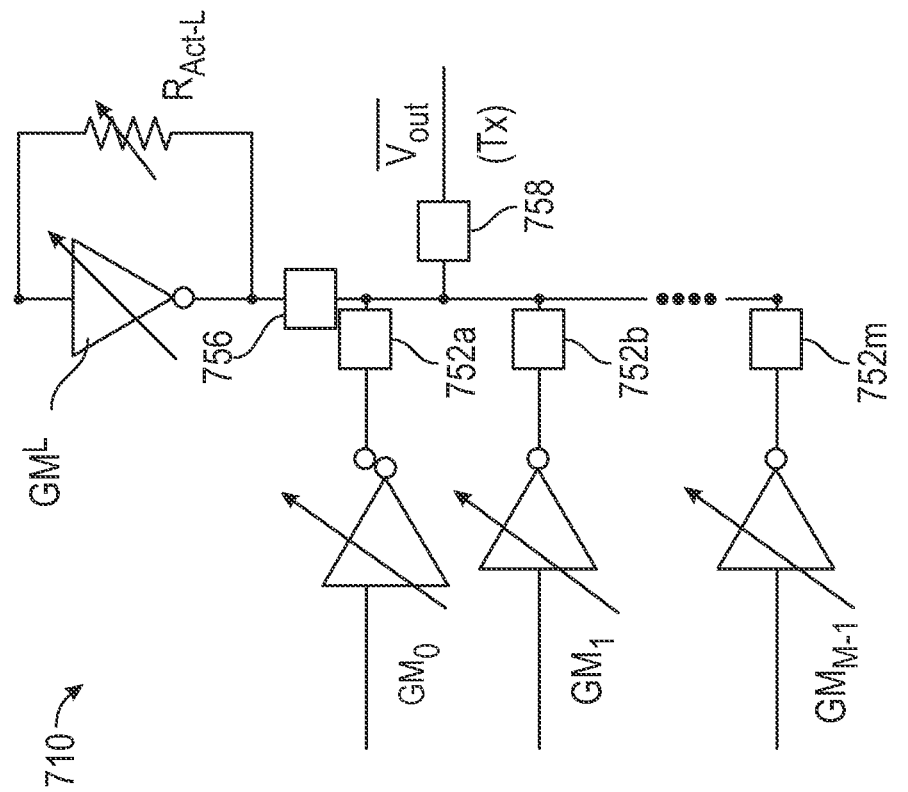

FIGS. 7A and 7B depict an example alternative transmitter circuitry 710 and an example alternative receiver circuitry 730 respectively, with included inductors at depicted locations of the transmitter and receiver circuitries 710 and 730, respectively.

FIG. 7A depicts the transmitter circuitry 710, corresponding to the transmitter circuitry 110 of FIG. 1, with the addition of, for example, passive inductors at one or more locations of the transmitter circuitry 710. The passive inductors can be added to the transmitter circuitry 710 to enable bandwidth extension and/or additional peaking for the transmitter circuitry 710. In some embodiments, the passive inductor added to the transmitter circuitry 710 comprises a shunt inductor, which may provide shunt peaking in the transmitter circuitry 710.

Alternatively, or additionally, the transmitter circuitry 710 may include one or more inductors 752a-752m at one or more locations for each parallel input circuitry of the transmitter circuitry 710, as indicated by the locations of the inductors 752a-752m. In some embodiments, the inductors 752a-752m, otherwise placed on one or more of the input circuitries, can be replaced with a single, common inductor (not shown explicitly, but which could be placed at any location of any of the inductors 752a-752m). In some embodiments, the inductors 752a-752m may be replaced by one single inductor where the outputs of the $GM_0$ to $GM_{M-1}$ are shorted and the multiple inductors 752a-752m are replaced by a single inductor. In some embodiments, one or more of inductors 756 and 758 could be placed as shown in the transmitter circuitry 710—with or without inductors 752a-752m. In some embodiments, the inductors 756 and 764 provide shunt-inductor-like peaking because the drain of the inverter behaves as a relatively low impedance. In some embodiments, the use of multiple inductors in such a fashion may enable magnetic mutual coupling between some or all of the inductor coils. In certain embodiments, the shunt inductor can be used in combination with inductors placed at the locations as shown in the transmitter circuitry 710, with or without mutual coupling.

FIG. 7B depicts the receiver circuitry 730, corresponding to the receiver circuitry 130 of FIG. 1, with the addition of, for example, passive inductors at one or more locations of the receiver circuitry 730. Similar to the discussion for the transmitter circuitry 710, the passive inductors can be added to the receiver circuitry 730 for similar reasons of enabling bandwidth extension and/or additional peaking for the receiver circuitry 730. The passive inductors 760-768 introduced to the receiver circuitry 730, as discussed above relative to the transmitter circuitry 710, similarly apply to the receiver circuitry 730. In some embodiments, combinations such as "series-shunt" (such as one or more of inductors 752a-752m with inductor 756) or "shunt series" (for example, inductor 756 with inductor 758) or series shunt series (for example, with one or more of inductors 752a-752m, inductor 756, and inductor 758) are also possible.

Figure 8:
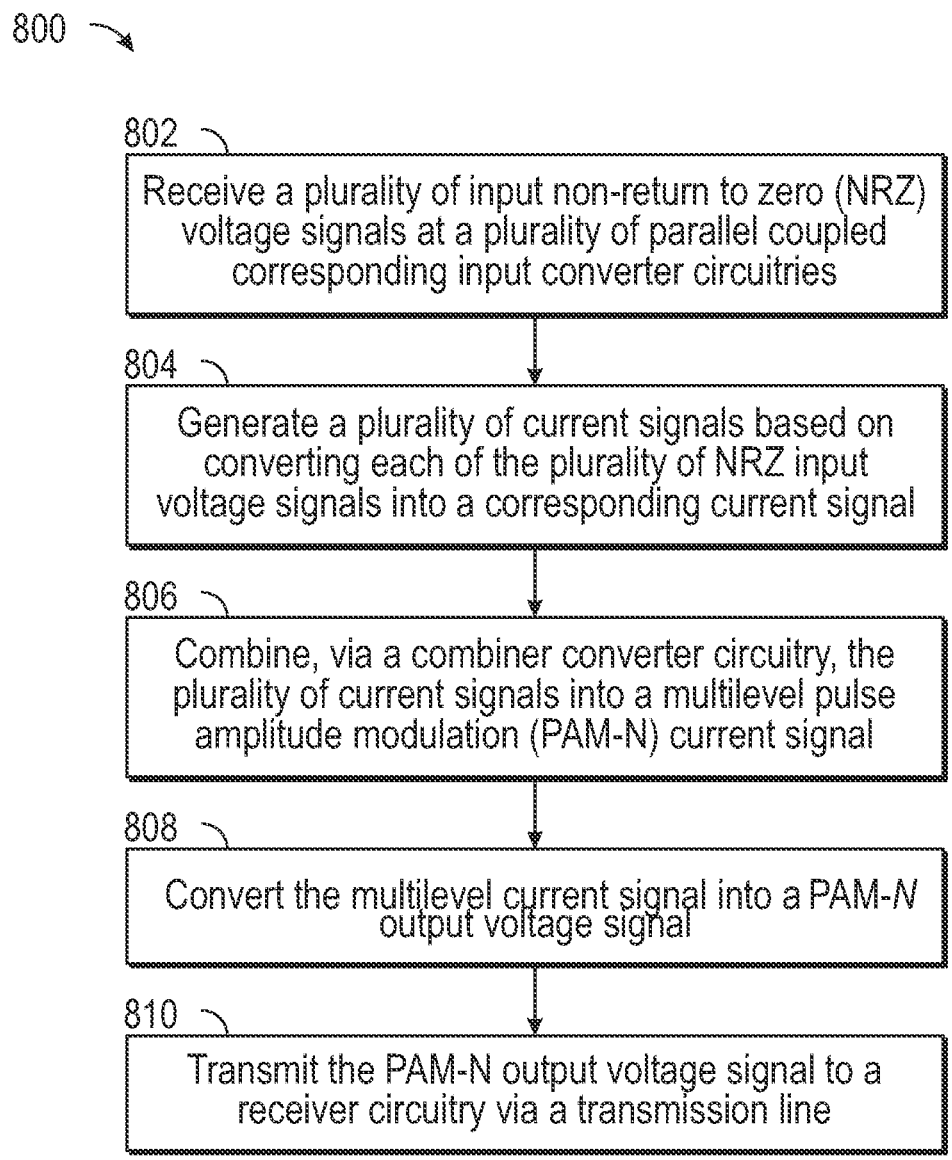
FIG. 8 depicts a flowchart for a method of transmitting data signals between a transmitter circuitry and a receiver circuitry via a channel, according to an exemplary embodiment.

FIG. 8 depicts a flowchart for a method 800 of transmitting data signals between a transmitter circuitry, such as the transmitter circuitry 110 of FIG. 1, and a receiver circuitry, such as the receiver circuitry 130, via a transmission line, such as the transmission line 120, according to an exemplary embodiment. In general, the method 800 can be used to transmit data between components on a single IC or between components on different ICs. In certain embodiments, steps of the method 800 can be performed in any order, additional steps can be added, or steps can be removed.

At block 802, a transmitter circuitry, such as the transmitter circuitry 110 of FIG. 1, receives a plurality of input non-return to zero (NRZ) voltage signals at a plurality of parallel coupled corresponding input converter circuitries (such as the V-to-I converters 113a-113m). In some embodiments, the transmitter circuitry receives a number M of received input NRZ voltage signals.

At block 804, the transmitter circuitry generates a plurality of current signals based on converting each of the plurality of NRZ input voltage signals into a corresponding current signal via the corresponding input converter circuitry. Thus, the transmitter circuitry generates M current signals based on the M NRZ input voltage signals.

At block 806, the transmitter circuitry combines the plurality of current signals into a multilevel PAM-N current signal. In some embodiments, the transmitter circuitry comprises the combiner converter portion 114 of FIG. 1.

At block 808, the transmitter circuitry converts the multilevel current signal into a PAM-N output voltage signal. In some embodiments, the value of N of the PAM-N signal is generated based on the number M of input NRZ voltage signals, where $N=2^M$. Other relationships between the value of N and the number M of input NRZ voltage signals (where $N !=2^M$) may exist as well.

At block 810, the transmitter circuitry transmits the PAM-N output voltage signal to a receiver circuitry via a coupled transmission line.

In some embodiments, the transmitter circuitry comprises CMOS-inverter-based circuitries, such as those described with respect to FIGS. 2A-3I.

In some embodiments, the transmitter circuitry comprises one or more input converter circuitries or the combiner converter circuitry that is hardcoded or programmed with a respective weight. In some embodiments, the method 800 further comprises programming a DC gain for at least one input converter circuitry or the combiner converter circuitry. In some embodiments, the method 800 further comprises programming a shunt impedance of the combiner converter circuitry based on an impedance of a transmission line configured to convey the output voltage signal to a receiver circuitry. In some embodiments, the method 800 further comprises programming an output filtering or peaking of the output voltage signal based on: (1) activating or deactivating individual components of the one or more input converter circuitries and the combiner converter circuitry in tandem to lower bandwidth or (2) programming a resistance of a resistor of the combiner converter circuitry for optional peaking in a frequency response. In some embodiments, the resistor comprises at least one of a passive or active triode resistor or a short circuit having no active inductor.

Figure 9A:
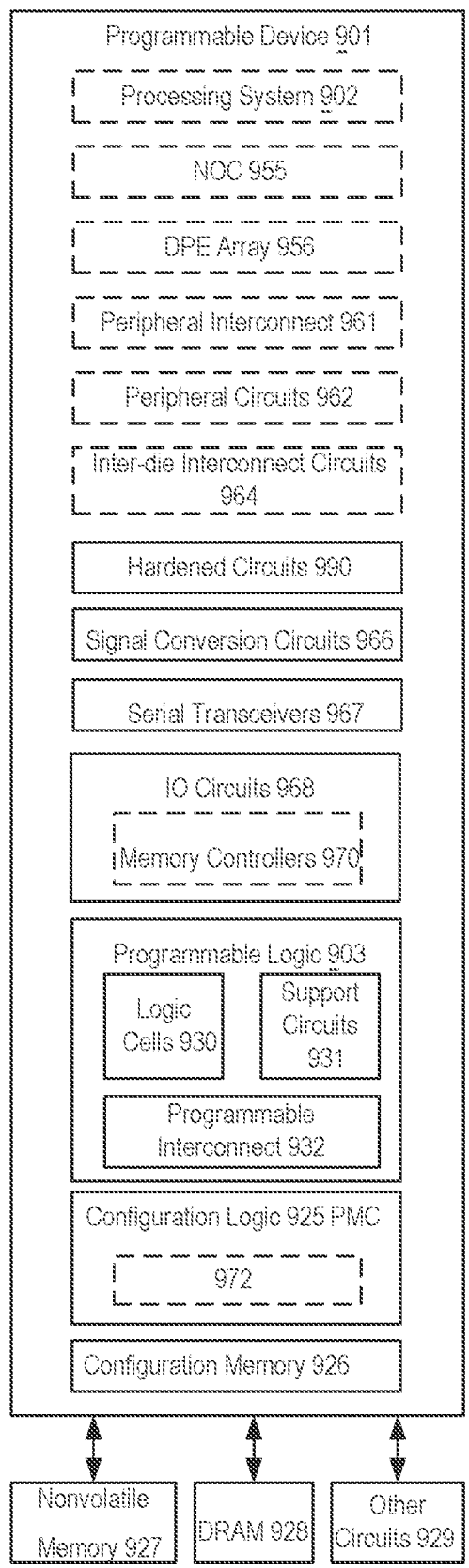
FIG. 9A is a block diagram depicting a programmable IC according to an example.

FIG. 9A is a block diagram depicting a programmable device 901 according to an example. The programmable device 901 includes programmable logic (PL) 903 (also referred to as a programmable fabric), input/output (IO) circuitries 968, serial transceivers 967, signal conversion circuitries 966, hardened circuitries 990, configuration logic 925, and configuration memory 926. The programmable device 901 can be coupled to external circuitries, such as nonvolatile memory 927, dynamic random access memory (DRAM) 928, and other circuitries 929. In various examples, the programmable device 901 further includes a processing system (PS) 902, a network-on-chip (NoC) 955, a data processing engine (DPE) array 956, peripheral interconnect 961, peripheral circuitries 962, and inter-die interconnect circuitries 964.

The PL 903 includes logic cells 930, support circuitries 931, and programmable interconnect 932. The logic cells 930 include circuitries that can be configured to implement general logic functions of a plurality of inputs. For example, the logic cells 930 may implement one or more of the NoC compiler discussed above in FIGS. 1-7. The support circuitries 931 include dedicated circuitries, such as digital signal processors, memories, and the like. The logic cells 930 and the support circuitries 931 can be interconnected using the programmable interconnect 932. Information for programming the logic cells 930, for setting parameters of the support circuitries 931, and for programming the programmable interconnect 932 is stored in the configuration memory 926 by the configuration logic 925. The configuration logic 925 can obtain the configuration data from the nonvolatile memory 927 or any other source (e.g., the DRAM 928 or from the other circuitries 929). In some examples, the configuration logic 925 includes a platform management controller (PMC) 972. The PMC 972 is configured to boot and configure the subsystems of the programmable device 901, such as the PL 903, the PS 902, the NoC 955, the DPE array 956, the signal conversion circuitries 966, the hardened circuitries 990, and the like.

The IO circuitries 968 provide an external interface for the subsystems of the programmable device 901, such as the PL 903, the PS 902, and the like. In some examples, the IO circuitries 968 include memory controllers 970 configured to interface external memories (e.g., the DRAM 928). Other connectivity circuitries can include the peripheral interconnect 961, the peripheral circuitries 962, and the inter-die interconnect circuitries 964. The peripheral interconnect 961 includes bus interface circuitries, such as peripheral component interconnect express (PCIe) circuitries and the like. The peripheral circuitries 962 include universal serial bus (USB) ports, Ethernet ports, universal asynchronous transceiver (UART) ports, serial peripheral interface (SPI) ports, general purpose IO (GPIO) ports, serial advanced technology attachment (SATA) ports, and the like. The inter-die interconnect circuitries 964 include circuitries configured to interface like inter-die interconnect circuitries in other programmable device(s) (e.g., for when the programmable device 901 is one die in a multi-die integrated circuit package). The serial transceivers 967 include high-speed transmit/receive circuitries configured to provide an external IO interface for the programmable device 901.

The PS 902 can include microprocessor(s), memory, support circuitries, IO circuitries, and the like. The NoC 955 is configured to provide for communication between subsystems of the programmable device 901, such as between the PS 902, the PL 903, the hardened circuitries 990, and the DPE array 956. The DPE array 956 can include an array of DPE's configured to perform data processing, such as an array of vector processors. The signal conversion circuitries 966 include analog-to-digital converters (ADCs) and digital-to-analog converters (DACs).

The hardened circuitries 990 comprise circuitries with predetermined functionality. A given hardened circuitry 990 can include one or more predetermined functions. Example hardened circuitries 990 include filters, mixers, sample-rate converters, transforms circuitries, and the like. A hardened circuitry 990 can be programmable to configure specific predetermined functionalities or select among predetermined functionalities. However, in contrast to a circuitry in the PL 903, a hardened circuitry 990 cannot be configured or reconfigured with different functionality. For example, a hardened circuitry 990 can include a filter having two predetermined and selectable functionalities. A third functionality cannot be added to the hardened circuitry 990, nor can one of the two functionalities be removed from the hardened circuitry 990. In contrast, a filter configured in the PL 903 can be reconfigured to add one more additional functionalities or to remove one or more functionalities. Further, a filter configured in the PL 903 can be removed entirely and replaced with another circuitry. In contrast, a hardened circuitry 990 cannot be removed from the programmable device 901 (but can be unused if desired).

Figure 9B:
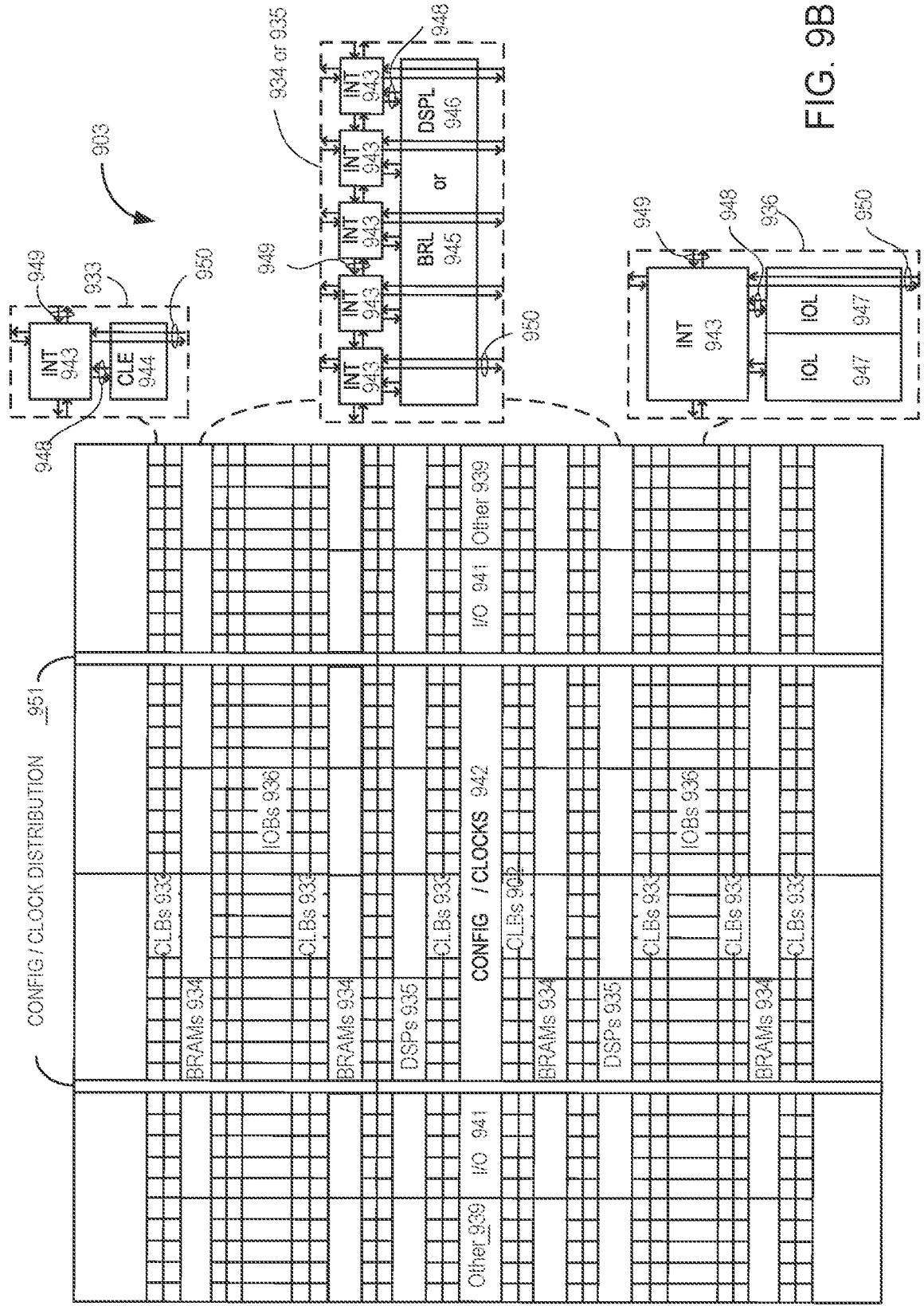
FIG. 9B illustrates a field programmable gate array (FPGA) implementation of a programmable IC according to an example.

FIG. 9B illustrates a field programmable gate array (FPGA) implementation of the PL 903 according to an example. The PL 903 shown in FIG. 9B can be used in any example of the programmable devices described herein. The PL 903 includes a large number of different programmable tiles including configurable logic blocks ("CLBs") 933, random access memory blocks ("BRAMs") 934, input/output blocks ("IOBs") 936, configuration and clocking logic ("CONFIG/CLOCKS") 942, digital signal processing blocks ("DSPs") 935, specialized input/output blocks ("I/O") 941 (e.g., configuration ports and clock ports), and other programmable logic 939 such as digital clock managers, analog-to-digital converters, system monitoring logic, and so forth.

In some PLs 903, each programmable tile can include at least one programmable interconnect element ("INT") 943 having connections to input and output terminals 948 of a programmable logic element within the same tile, as shown by examples included at the top of FIG. 9B. Each programmable interconnect element 943 can also include connections to interconnect segments 949 of adjacent programmable interconnect element(s) in the same tile or other tile(s). Each programmable interconnect element 943 can also include connections to interconnect segments 950 of general routing resources between logic blocks (not shown). The general routing resources can include routing channels between logic blocks (not shown) comprising tracks of interconnect segments (e.g., interconnect segments 950) and switch blocks (not shown) for connecting interconnect segments. The interconnect segments of the general routing resources (e.g., interconnect segments 950) can span one or more logic blocks. The programmable interconnect elements 943 taken together with the general routing resources implement a programmable interconnect structure ("programmable interconnect") for the illustrated PL.

In an example implementation, a CLB 933 can include a configurable logic element ("CLE") 944 that can be programmed to implement user logic plus a single programmable interconnect element ("INT") 943. A BRAM 934 can include a BRAM logic element ("BRL") 945 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 935 can include a DSP logic element ("DSPL") 946 in addition to an appropriate number of programmable interconnect elements. An IOB 936 can include, for example, two instances of an input/output logic element ("IOL") 947 in addition to one instance of the programmable interconnect element 943. As will be clear to those of skill in the art, the actual I/O pads connected, for example, to the I/O logic element 947 typically are not confined to the area of the input/output logic element 947.

In the pictured example, a horizontal area near the center of the die (shown in FIG. 9B) is used for configuration, clock, and other control logic. Vertical columns 951 extending from this horizontal area or column are used to distribute the clocks and configuration signals across the breadth of the PL.

Some PLs utilizing the architecture illustrated in FIG. 9B include additional logic blocks that disrupt the regular columnar structure making up a large part of the PL. The additional logic blocks can be programmable blocks and/or dedicated logic.

Note that FIG. 9B is intended to illustrate only an exemplary PL architecture. For example, the numbers of logic blocks in a row, the relative width of the rows, the number and order of rows, the types of logic blocks included in the rows, the relative sizes of the logic blocks, and the interconnect/logic implementations included at the top of FIG. 9B are purely exemplary. For example, in an actual PL more than one adjacent row of CLBs is typically included wherever the CLBs appear, to facilitate the efficient implementation of user logic, but the number of adjacent CLB rows varies with the overall size of the PL.

Figure 9C:
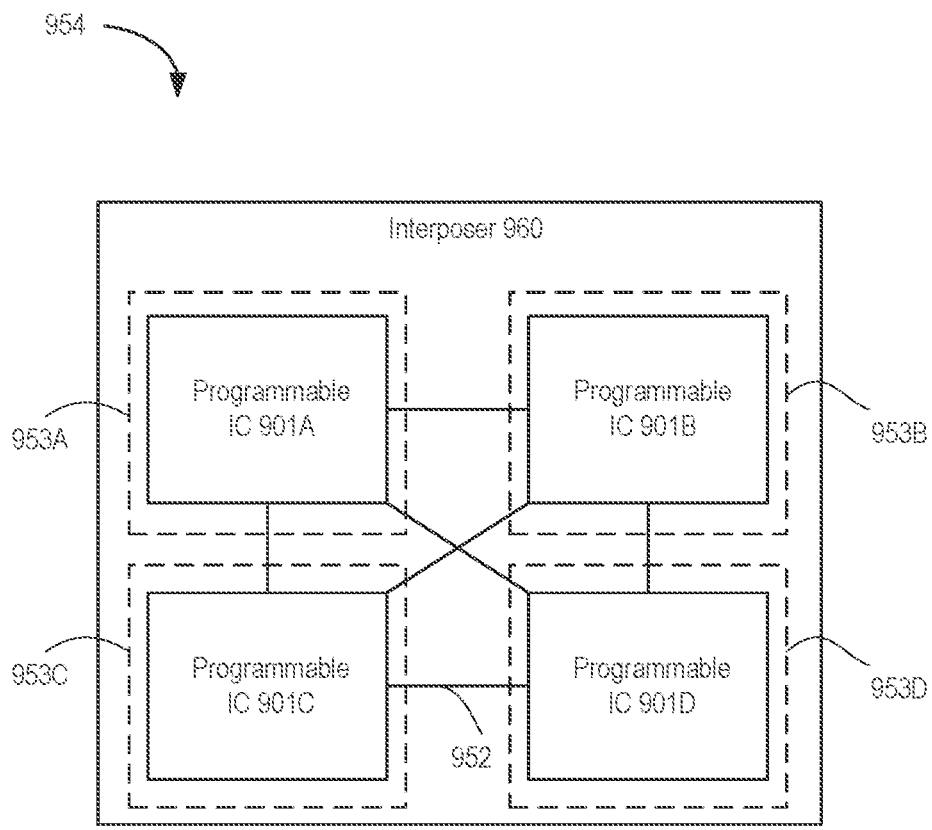
FIG. 9C is a block diagram depicting a multi-integrated circuit (IC) programmable device according to an example.

FIG. 9C is a block diagram depicting a multi-die programmable device 954 according to an example. The multi-die programmable device 954 includes a plurality of programmable devices 901, e.g., programmable devices 901A, 901B, 901C, and 901D. In an example, each programmable device 901 is an IC die disposed on an interposer 960. Each programmable device 901 comprises a super logic region (SLR) 953 of the programmable device 954, e.g., SLRs 953A, 953B, 953C, and 953D. The programmable devices 901 are interconnected through conductors on the interposer 960 (referred to as super long lines (SLLs) 52) and inter-die interconnect circuitries 964 disposed within each of the programmable devices 901. The programmable ICs could form the NoC compiler described above in FIGS. 1-6C.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or apparatus, and the like. Accordingly, aspects may take the form of an entirely hardware embodiment or a combination of hardware products or an embodiment combining hardware aspects with corresponding programming that may all generally be referred to herein as a "circuitry" or "system." Furthermore, certain aspects, such as programmable logic blocks, lookup tables (LUTs), and the like, may take the form of hardware components that can be controlled using corresponding programming.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations or programming for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and apparatuses according to various examples of the present invention. In this regard, each block in the flowchart or block diagrams may represent a circuitry, programming for such circuitry, or portion of instructions for such circuitry, which comprises one or more executable instructions for controlling or programming the circuitry to perform the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A transmitter circuit comprising:
   two or more input converter circuits coupled in parallel, each of the two or more input converter circuits configured to convert a non-return-to-zero (NRZ) input voltage signal to a corresponding current signal; and
   a combining circuit, the combining circuit configured to combine and convert the two or more corresponding current signals into an output voltage signal,
   wherein the two or more input converter circuits and the combining circuit convert the corresponding two or more NRZ input voltage signals received by the two or more input converter circuits into a pulse amplitude modulation level N (PAM-N) signal output as the output voltage signal,
   wherein the two or more input converter circuits and the combining circuit comprise a CMOS-inverter-based circuit, and
   wherein a value N is defined based, at least in part, on a number of NRZ input voltage signals received by the two or more input converter circuits and relative strengths of the input converter circuits.

2. The transmitter circuit of claim 1, wherein each of the two or more input converter circuits or the combining circuit are hardcoded or programmed with a respective weight.

3. The transmitter circuit of claim 2, wherein the respective weights for the two or more input converter circuits are programmed to reduce a number of levels in the PAM-N signal output based on tristating at least one of the two or more input converter circuits or making the NRZ input voltage signal of a plurality of the two or more input converter circuits identical.

4. The transmitter circuit of claim 2, wherein the respective weights for the two or more input converter circuits are different from one another.

5. The transmitter circuit of claim 1, wherein a DC gain for at least one of the input converter circuits or the combining circuit is programmable.

6. The transmitter circuit of claim 1, wherein an effective shunt impedance for the combining circuit is programmed based on an impedance of a transmission line or channel configured to convey the output voltage signal to a receiver circuit.

7. The transmitter circuit of claim 1, wherein an output filtering or peaking of the output voltage signal is programmed based on one or more of: (1) activating or deactivating individual circuits of the input converter circuits and the combining circuit in tandem to lower bandwidth, (2) programming a resistance of a resistor in parallel with a combiner converter circuitry of the combining circuit, or (3) programming of a capacitance connected to the resistor for optional peaking in a frequency response.

8. The transmitter circuit of claim 7, wherein the resistor comprises at least one of a passive resistor or active triode resistor.

9. A method of transmitting data signals, the method comprising:
   receiving a plurality of non-return to zero (NRZ) input voltage signals at a plurality of parallel coupled corresponding input converter circuits;
   generating a plurality of current signals based on converting each of the plurality of NRZ input voltage signals into a corresponding current signal via the plurality of parallel coupled corresponding input converter circuit;
   combining, via a combiner converter circuit, the plurality of current signals into a multilevel pulse amplitude modulation (PAM-N) current signal; and
   converting the multilevel PAM-N current signal into a PAM-N output voltage signal,
   wherein the plurality of parallel coupled corresponding input converter circuits and the combiner converter circuit comprise CMOS-inverter-based circuits, and
   wherein a value N is defined based on a number of NRZ input voltage signals received by a number of the plurality of parallel coupled input converter circuits and based on relative strengths of the plurality of parallel coupled corresponding input converter circuits.

10. A data link circuit comprising:
    a transmitter circuit configured to:
       receive a plurality of input non-return-to-zero (NRZ) voltage signals;
       convert the input NRZ voltage signals into corresponding current signals; and
       generate a PAM-N signal as an output voltage signal based on the plurality of current signals;
    a receiver circuit configured to:
       receive the PAM-N signal from the transmitter circuit; and
       generate an output PAM-N signal based on processing the received PAM-N signal; and
    a transmission line or channel configured to convey the PAM-N signal from the transmitter circuit to the receiver circuit,
    wherein:
       a value N is defined based on a number of the plurality of input NRZ voltage signals received by the transmitter circuit and based on relative weightings of input converter circuits in the transmitter circuit.

11. The data link circuit of claim 10, wherein the receiver circuit comprises a plurality of input paths from the transmitter circuit.

12. The data link circuit of claim 11, wherein each of the plurality of input paths comprises (1) an independent inverter circuit coupled to a shared inverter circuit shared between the plurality of input paths and configured to generate the output PAM-N signal or (2) an independent switch circuit coupled to a first shared inverter circuit and a second shared inverter circuit that are both shared between the plurality of input paths and configured to generate the output PAM-N signal.

13. The data link circuit of claim 10, wherein the receiver circuit comprises a termination resistor configured to adjust an effective input impedance of the receiver circuit based on an impedance of the transmission line or channel.

14. The data link circuit of claim 13, wherein the termination resistor is configurable to trade a swing vs. a bandwidth vs. a matching to the transmission line or channel.

15. The data link circuit of claim 10, wherein at least one of the transmitter circuit or the receiver circuit comprises a passive resistor or active triode resistor coupling an input to an output of an inverter circuit that generates the respective PAM-N signal.

16. The data link circuit of claim 15, wherein one or both of the passive resistor or active triode resistor are short circuited with or replaced by a low ohmic connection.

17. The data link circuit of claim 10, wherein the data link circuit comprises a single-ended architecture in the transmitter circuit and the receiver circuit or a differential architecture in the transmitter circuit and the receiver circuit or a pseudo differential architecture in the transmitter circuit and the receiver circuit.

18. The data link circuit of claim 10, wherein one or more of the transmitter circuit or the receiver circuit comprises at least one passive inductor configured to provide bandwidth extension and/or peaking in the transmitter circuit or receiver circuit, respectively.

19. The data link circuit of claim 10, wherein the receiver circuit comprises a single input path from the transmitter circuit.

20. The data link circuit of claim 10, wherein the transmitter circuit and the receiver circuit both comprise CMOS-inverter based circuits or wherein the receiver circuit does not comprise CMOS-inverter based circuits.

\* \* \* \* \*